United States Patent

Uno

[11] Patent Number: 6,122,116
[45] Date of Patent: Sep. 19, 2000

[54] COLLAPSIBLE TYPE ZOOM LENS BARREL HAVING SPACE FOR ACCOMMODATING A COMPONENT

[75] Inventor: Tetsuya Uno, Sakai, Japan

[73] Assignee: Minolta Co., Ltd., Osaka, Japan

[21] Appl. No.: 09/322,034

[22] Filed: May 28, 1999

[30] Foreign Application Priority Data

May 29, 1998 [JP] Japan .................................. 10-148938

[51] Int. Cl.[7] ....................................................... G02B 7/02
[52] U.S. Cl. ............................................ 359/826; 359/823
[58] Field of Search ..................................... 359/694, 695, 359/696, 703, 704, 823, 824, 829

[56] References Cited

U.S. PATENT DOCUMENTS 5,196,963  3/1993  Sato et al. ................................. 359/699
5,198,932  3/1993  Takamura .................................. 359/694

FOREIGN PATENT DOCUMENTS 2-198433  8/1990  Japan .
6-018777  1/1994  Japan .
8-094901  4/1996  Japan .

*Primary Examiner*—Ricky Mack
*Attorney, Agent, or Firm*—Burns, Doane, Swecker & Mathis, LLP

[57] ABSTRACT

A structure, used for a collapsible type of zoom lens barrel provided in a camera, which makes advantageous a wiring of an electric wire extending between a side of a camera body and an electrically driven device which is installed within a space inside the zoom lens barrel, in an attempt of effective use of the space therein. The zoom lens barrel includes: a stationary lens barrel, rectangular in cross section, fitting to a rectangular exposure window of a picture frame in front of a film set inside the camera body; a first movable lens barrel, rectangular in cross section, slidably fitted inside the stationary lens barrel; and a second movable lens barrel, circular in cross section, slidably fitted inside the first movable lens barrel, in which the zoom lens barrel can take a projecting state and a retracting state. In the retracting state, the space is formed between the first movable lens barrel and the second movable lens barrel, in which space the electrically driven device is positioned.

12 Claims, 17 Drawing Sheets

COLLAPSIBLE TYPE ZOOM LENS BARREL HAVING SPACE FOR ACCOMMODATING A COMPONENT

This application is based upon application No. 10-148938 filed in Japan, the contents of which are hereby incorporated by reference.

BACKGROUND OF THE INVENTION

1. Field of the Invention

The present invention relates to a collapsible type of zoom lens barrel, used for a camera, which is composed of a plurality of lens barrels, and particularly relates to the zoom lens barrel having a space inside between the lens barrels in which space an electric component such as an electric motor is mounted.

2. Description of the Related Art

Conventionally, there has been provided a collapsible type of zoom lens barrel which has a combination of a plurality of lens barrels, each of which has a cross section, perpendicular to a photographing optical axis, that is generally rectangular in shape, as disclosed in Japanese Laid-Open Patent Publication Nos. 1-130114 and 4-289806. Hereinafter, the lens barrel that is generally rectangular in shape is referred to as a "rectangular lens barrel."

FIGS. 15 to 17 show an example of such a zoom lens barrel which is constituted by telescopically combining three rectangular lens barrels. FIG. 15 is a vertical sectional view which shows the zoom lens barrel in a telephoto state in which the zoom lens barrel projects. FIG. 16 is a partly cut-out view of the zoom lens barrel of FIG. 15, as viewed from a bottom side thereof, and FIG. 17 is a horizontal sectional view of the zoom lens barrel of FIG. 15.

A picture frame 111 is fixed to an inner part of a camera body, and the picture frame 111 is located on a front side (i.e. on a subject side, or on an object side) of a photographing film to be exposed. The picture frame 111 has a rectangular exposure window 112 which leads a light, which has passed through a photographing lens, to the photographing film, which locates on a right side of the picture frame 111 in the figures.

A stationary barrel 120, in which its cross section that is perpendicular to the optical axis (i.e. the photographing optical axis) is formed into a rectangular shape being fitted to the rectangular exposure window 112, is fixed to the picture frame 111. In other words, the stationary lens barrel 120 is immovable relative to the picture frame 111, therefore relative to the camera body.

A movable lens barrel 130 is telescopically fitted to an inside of the stationary lens barrel 120, and the movable lens barrel 130 is driven by a screw bar 113 as shown in FIG. 16 so that the movable lens barrel 130 is projected, or is fed outside, from the stationary lens barrel 120. That is, the screw bar 113 is fixed immovably in the direction of the optical axis, but rotatably, relative to the camera body. In addition, the movable lens barrel 130 has, on its bottom side, a nut portion 131 engaging with the screw bar 113.

In the mechanism, when the screw bar 113 rotates, the movable barrel 130 is moved back and forth in a direction of the optical axis.

In addition, a reference numeral 114 in FIG. 16 denotes a guide bar for guiding a movement of the movable barrel 130 in the direction of the optical axis. More specifically, a sleeve-like member 132, which is fixed to the bottom side of the movable lens barrel 130, engages with the guide bar 114.

In addition, a reference numeral 115 denotes a rotation inhibiting bar for preventing the movable lens barrel 130 from rotating about the guide bar 114. An engagement portion 135, which is fixed to a top side of the movable lens barrel 130, engages with the rotation inhibiting bar 115.

On a bottom inner surface of the movable lens barrel 130, is placed a cam plate 150. The cam plate 150 is coupled to the movable lens barrel 130 by a rotational-shaft protrusion 151 which engages with a recessed portion (or concave portion) being provided on the bottom inner surface of the movable lens barrel 130. Therefore, the cam plate 150 is rotatable about the rotational-shaft protrusion 151 on the bottom inner surface of the movable barrel 130. As shown in FIG. 16, a pin 152 is provided near a photographer-side end portion on the cam plate 150. The pin 152 engages with a cam slot 121 which is formed on the bottom surface of the stationary lens barrel 120. In the arrangement, the cam slot 121 inclines with respect to the optical axis. Therefore, when the movable lens barrel 130 moves relative to the stationary lens barrel 120, the cam plate 150 rotates about the rotational-shaft protrusion 151 along with the movement of the movable barrel 130.

Further, near a subject-side (or an object-side) end portion of the cam plate 150, are formed a pair of cam slots 153, 154. These cam slots 153, 154, as will be explained in detail later, have a function to make a first lens group 160 and a second lens group 170 move relative to the movable lens barrel 130, respectively. A movable lens barrel 140 for holding the first lens group 160, and the second lens group 170, are arranged inside the movable lens barrel 130, where the movable lens barrel 140 for holding the first lens group 160 and the second lens group 170 are moved relative to each other in the direction of the optical axis. In addition, the first lens group 160 is fixed within a lens holding circular cylinder (i.e. lens frame) 141 which is fixed to the movable lens barrel 140 for holding the first lens group 160, and the second lens group 170 is fixed within its lens frame 171.

As shown in FIG. 15, a pair of bar-shaped members, namely a guide bar 133 near the bottom side thereof and a rotation inhibiting bar 134 near the top side thereof, are fixed to the inside of the movable lens barrel 130. The guide bar 133 guides a movement of the movable lens barrel 140 for holding the first lens group 160 in the direction of the optical axis, and also guides a movement of the lens frame 171 for holding the second lens group 170 in the same direction.

A sleeve-like member 142 is fixed to the movable lens barrel 140 for holding the first lens group 160, and a sleeve-like member 172 is fixed to the lens frame 171 of the second lens group 170, respectively. Each of these sleeve-like members 142, 172 engages with the guide bar 133. The rotation inhibiting bar 134 inhibits each of the movable lens barrel 140 for holding the first lens group 160 and the lens frame 171 of the second lens group 170 from rotating about the guide bar 133. Namely, an engagement portion 143 is fixed to the movable lens barrel 140 for holding the first lens group 160, and an engagement portion 173 is fixed to the lens frame 171 of the second lens group 170, respectively. These engagement portions 143, 173 engage with the rotation inhibiting bar 134, respectively.

With the arrangement, the movable lens barrel 140 for holding the first lens group 160 and the lens frame 171 of the second lens group 170 are movable back and forth in the direction of the optical axis without rotation.

A pin 144 is fixed on a bottom side of the movable lens barrel 140 for holding the first lens group 160, and a pin 174 is fixed on a lower side of the lens frame 171 of the second lens group 170, respectively, as shown in FIGS. 15 and 16. In the arrangement, the pin 144 of the movable lens barrel 140 engages with the cam slot 153 which is formed near the subject-side end portion of the cam plate 150; meanwhile, the pin 174 of the lens frame 171 engages with the cam slot 154 which is formed also near the subject-side end portion of the cam plate, but is slightly closer to the photographer with respect to the cam slot 153.

As explained above, when the movable lens barrel 130 moves relative to the stationary lens barrel 120, the cam plate 150 rotates in linkage with the movement of the movable lens barrel 130 relative thereto. Because the movable lens barrel 140 for holding the first lens group 160 and the lens frame 171 of the second lens group 170 connected to this cam plate 150 via the pins 144 and 174 respectively, each of the movable lens barrel 140 and the lens frame 171 also moves back and forth respectively in the direction of the optical axis in linkage with the back-and-forth movement of the movable lens barrel 130.

Besides, because the two cam slots 153, 154 are formed so as to have an angle therebetween as shown in FIG. 16, the movable lens barrel 140 for holding the first lens group 160 and the lens frame 171 of the second lens group 170 move in the direction of the optical axis while the relative distance between the movable barrel 140 and the lens frame 171 is changing, thereby achieving an zooming operation of the zoom lens barrel of the camera.

As explained above, each of the three lens barrels 120, 130, 140 has the cross section, perpendicular to the optical axis, that is rectangular in shape; namely, each of the three lens barrels 120, 130, 140 is constructed as the rectangular lens barrel. In the construction, only the stationary lens barrel 120 is positioned permanently immovably relative to the camera body; on the other hand, the movable lens barrels 130, 140 are fed out, or projected, from the front side of the camera. FIGS. 15 to 17 illustrate only the zoom lens barrel, where a broken line "A", designated at a front edge of the stationary lens barrel 120 in the figures, shows an exterior member which locates on a front side of the camera. In the figure, the aforementioned film, which locates on the right side of the frame 111, is designated by an imaginary line.

Now, attention is paid to one, lens barrel located at the forefront of the camera, of the three rectangular lens barrels 120, 130, 140 in FIG. 17. Inside the movable lens barrel 140 for holding the first lens group 160, the lens holding circular cylinder 141 for holding the first lens group 160 is disposed, as described above. There exists a certain space 140a between the movable lens barrel 140 having the rectangular cross section and the lens holding circular cylinder 141 having the circular cross section. This space, although appearing a little bit in FIG. 15 that is the vertical sectional view of the zoom lens barrel, is too narrow to put into effective use. A major part of the space appears in FIG. 17 that is the horizontal sectional view of the zoom lens barrel.

In the arrangement, a miniaturization of a whole body of the camera is realized by mounting a focusing motor 148 for driving a shutter actuator 147 and for driving a focusing mechanism 149 in the space 140a.

However, according to the above mechanism as shown in FIGS. 15 to 17, all the lens barrels 120, 130, 140 for constructing the zoom lens barrel, are composed of the rectangular cylinders (i.e. rectangular lens barrels). Therefore, the space 140a exists necessarily within the movable lens barrel 140, for holding the first lens group 160, which is an innermost movable lens barrel of all the movable lens barrels 130, 140 which are telescopically fitted one over the other. As a matter of course, the movable lens barrel 140 for holding the first lens group 160, when it is in the telephoto state, is located at a position farthest from the camera body (i.e. at a position closest to the subject, or object, to be photographed). Consequently, in case of installing an electric component, such as a motor, inside the space 140a, an electric wire extending from the camera body side cannot help but be relatively longer, in consideration of the relatively longer distance between the camera body and the movable lens barrel 140 locating at the forefront when it is in the telephoto condition. Namely, this arrangement has a disadvantage in view of realization of an effective electrical wiring, or the like.

SUMMARY OF THE INVENTION

Accordingly, it is an object of the present invention to provide a collapsible type of zoom lens barrel in which it is possible to make advantageous the wiring, or arrangement, of an electric wire extending between the camera body side and an electric component positioned inside the space within the zoom lens barrel, etc., in an attempt of effective use of the space inside the camera.

In order to achieve the above object, according to one aspect of the present invention, there is provided a zoom lens barrel, comprising: a stationary lens barrel which is hollow and rectangular in cross section being perpendicular to an optical axis and which can, for example, correspond to a rectangular exposure window of a photographing frame, in which the photographing frame is provided in front of a film, to be exposed, which is set inside a camera body; a first movable lens barrel which is hollow and rectangular in cross section being perpendicular to the optical axis, and which slidably moves inside the stationary lens barrel in a direction of the optical axis; and a second movable lens barrel which is hollow and circular in cross section being perpendicular to the optical axis, and which slidably moves inside the first movable lens barrel, wherein the zoom lens barrel can take a projecting state and a retracting state, wherein at least one electric component is positioned inside the first movable lens barrel, and wherein the at least one electric component is positioned in a space outside the second movable lens barrel when the zoom lens barrel is in the retracting state.

In the mechanism, when the zoom lens barrel is in the projecting state, at least the second movable lens barrel is located more forward than the first movable lens barrel (i.e. the second movable lens barrel is closer to an object, or subject, to be photographed than the first movable lens barrel is). In the mechanism, the space for housing the electric component is not inside the second movable lens barrel, but is inside the first movable lens barrel. In other words, when the zoom lens barrel is in the projecting state, the space for housing the electric component is not at a location furthest from the camera body, but at a location relatively closer to the camera body.

Therefore, in contrast with the aforementioned conventional zoom lens barrel as shown in FIGS. 15 through 17, the wiring, or arrangement, of the electric wire(s) extending between the camera body side and the electric component being inside the space within the zoom lens barrel, etc. is relatively advantageous in an attempt of the effective use of the space inside the camera.

In order to achieve the above object, according to another aspect of the present invention, there is provided a zoom lens barrel, comprising: a stationary lens barrel which is hollow and rectangular in cross section being perpendicular to an optical axis and which can, for example, correspond to a rectangular exposure window of a photographing frame, in which the photographing frame is provided in front of a film, to be exposed, which is set inside a camera body; a first movable lens barrel which is hollow and rectangular in cross section being perpendicular to the optical axis, and which slidably moves inside the stationary lens barrel in a direction of the optical axis; a drive lens barrel which is hollow and circular in cross section being perpendicular to the optical axis, and which is held inside the first movable lens barrel, in which the drive lens barrel is rotatable relative to the first movable lens barrel, and in which the drive lens barrel is unmovable relative to the first movable lens barrel in the direction of the optical axis; and at least one lens group which is held inside the drive lens barrel, in which the at least one lens group is movable relative to the drive lens barrel in the direction of the optical axis, wherein at least one electric component is accommodated in a space between the first movable lens barrel and the drive lens barrel.

In the mechanism, when the zoom lens barrel is in the projecting state, the lens group located at the most forward position (i.e. the lens group located closest to the object, or subject, to be photographed), is closer to the object, or subject, than the first movable lens barrel is. Namely, the space for housing the electric component is arranged inside the first movable lens barrel which is on a side closer to the camera body relative to the lens frame for holding the lens group located at the most forward position.

Therefore, with this mechanism, an advantage similar to the one described above is surely realized.

In the mechanism, preferably, the first movable lens barrel has a plurality of linear guide members which are fixed to an inside of a body of the first movable lens barrel, in which each of the plurality of linear guide members extends in the direction of the optical axis, in which the plurality of linear guide members are included in a peripheral surface of an imaginary cylinder, and in which the drive lens barrel rotatably engages an outside of the plurality of linear guide members, wherein the stationary lens barrel comprises a first helicoid part which is formed partially on an inner surface of the stationary lens barrel, in which the drive lens barrel comprises a second helicoid part which is formed at least partially on an outer surface of the drive lens barrel and which engages the first helicoid part of the stationary lens barrel, and in which the drive lens barrel comprises a drive gear part which is formed at least partially on the outer surface of the drive lens barrel, wherein there is further provided at least one lens frame for supporting the at least one lens group, in which the drive lens barrel comprises one, of a cam groove and a first helicoid, which is formed on an inner surface of the drive lens barrel, in which the lens frame comprises one of a pin that engages the cam groove and a second helicoid that engages the first helicoid, and in which the lens frame further comprises an engagement part which engages the linear guide member, and wherein when the drive gear part of the drive lens barrel is driven by a driving force exerted from a driving motor so as to rotate the drive lens barrel relative to the first movable lens barrel, the first movable lens barrel slidably moves relative to the stationary lens barrel in the direction of the optical axis due to an engagement between the first helicoid part of the stationary lens barrel and the second helicoid part of the drive lens barrel, while the at least one lens group moves relative to the drive lens barrel along the linear guide member in the direction of the optical axis.

According to the mechanism, when the drive lens barrel is rotated on receipt of the driving force from the drive motor via the drive gear part, the first movable lens barrel moves relative to the stationary lens barrel in the direction of the optical axis due to the engagement between the first helicoid part of the stationary lens barrel and the second helicoid part of the drive lens barrel, while the at least one lens group moves relative to the drive lens barrel along the linear guide member in the direction of the optical axis.

In each of the above mechanism, the at least one electric component, for example, can be at least one of a drive motor for driving the first movable lens barrel or the second movable lens barrel, a drive motor for driving a shutter, an AF unit, an AE unit, and an LED for a self-timer. timer.

Of course, the electric component is not limited to the component listed above.

In the mechanism, the at least one electric component can be supported by the first movable lens barrel, and/or the at least one electric component can move together with the first movable lens barrel relative to the stationary lens barrel, and/or there can be further provided another movable lens barrel, which is hollow and circular in cross section being perpendicular to the optical axis, and which slidably moves inside the second movable lens barrel or inside the drive lens barrel.

BRIEF DESCRIPTION OF THE DRAWINGS

This and other objects and features of the present invention will become clear from the following description taken in conjunction with a preferred embodiment thereof with reference to the accompanying drawings, in which.

DETAILED DESCRIPTION OF THE PREFERRED EMBODIMENT

Figure 1:
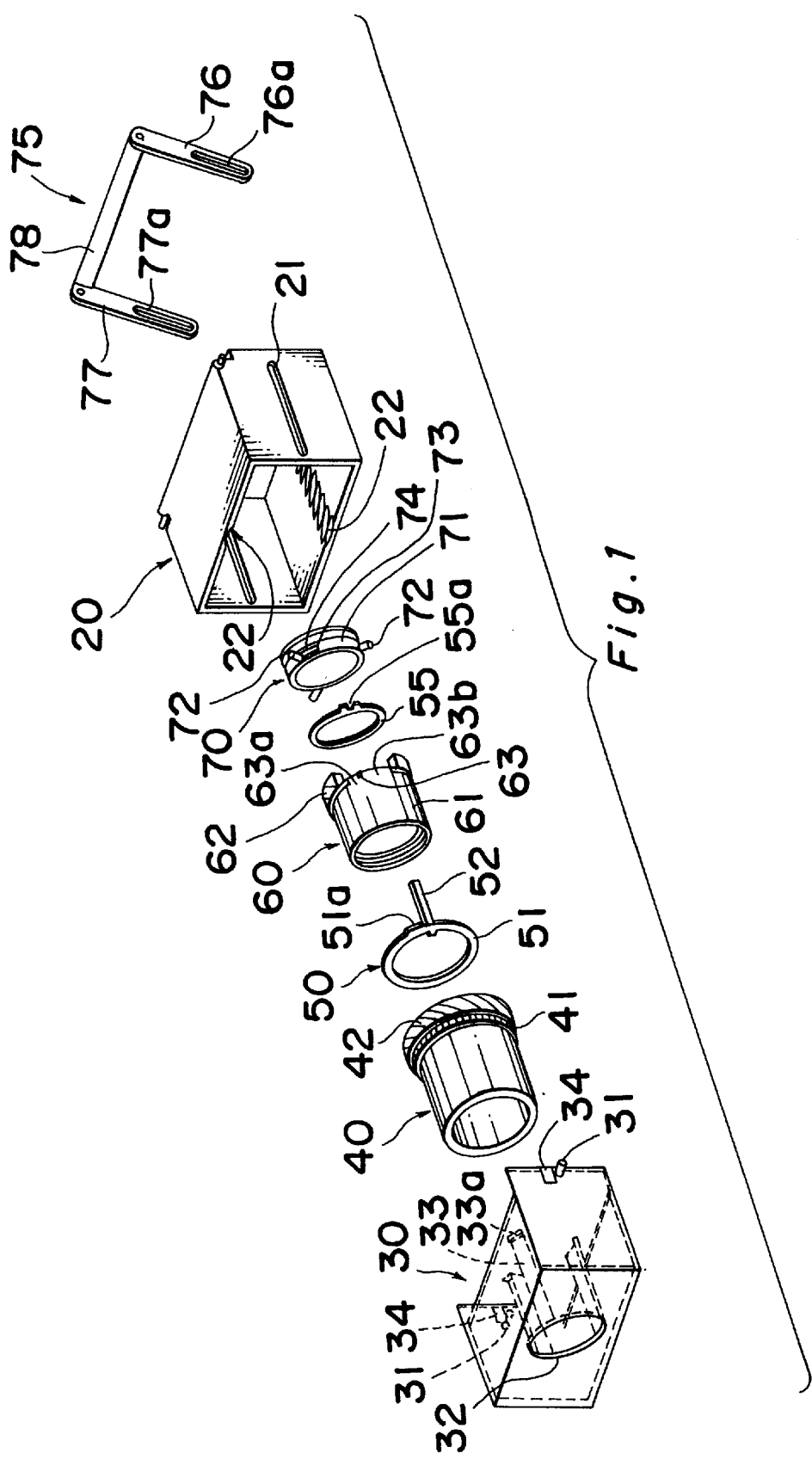
FIG. 1 is an exploded perspective view of a zoom lens barrel of a camera according to a preferred embodiment of the present invention.

Before a detailed description of a preferred embodiment proceeds, it is to be noted that like or corresponding parts are designated by like reference numeral throughout the accompanying drawings.

Referring to FIGS. 1 through 14, the description is made below upon a zoom lens barrel of a camera according to the preferred embodiment of the present invention, and according to modifications of the embodiment.

Figure 2:
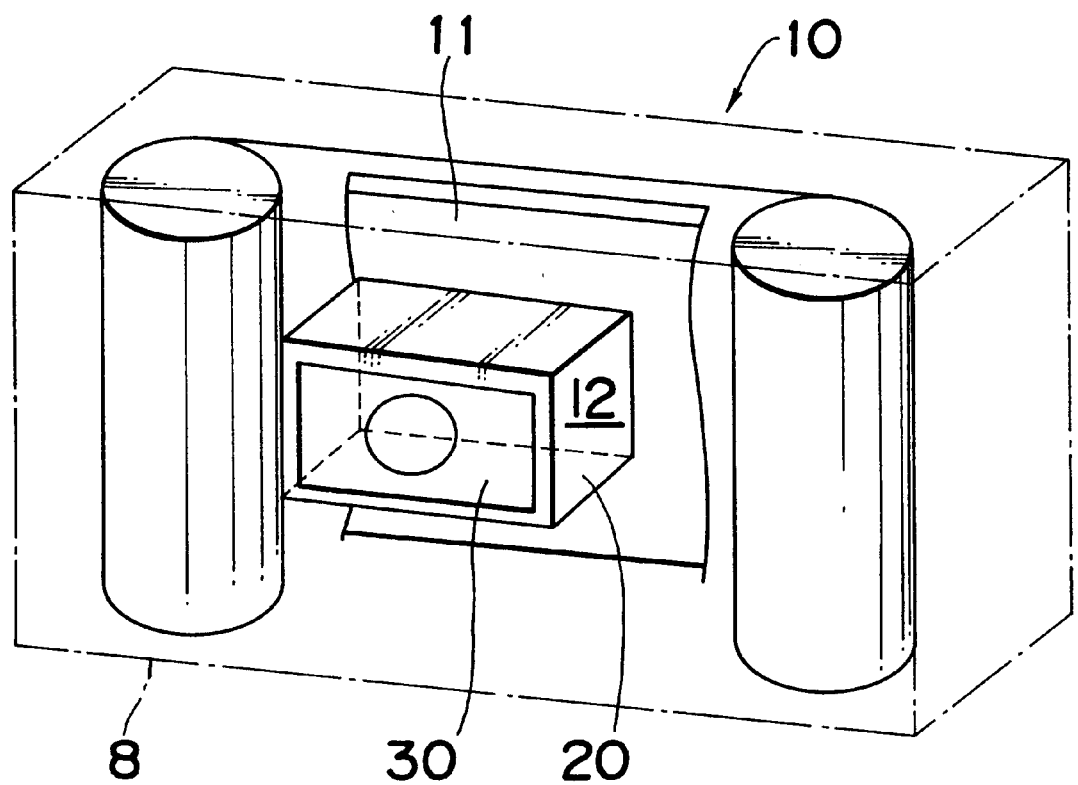
FIG. 2 is a perspective view schematically showing the camera which is equipped with the zoom lens barrel of FIG. 1.
Figure 3:
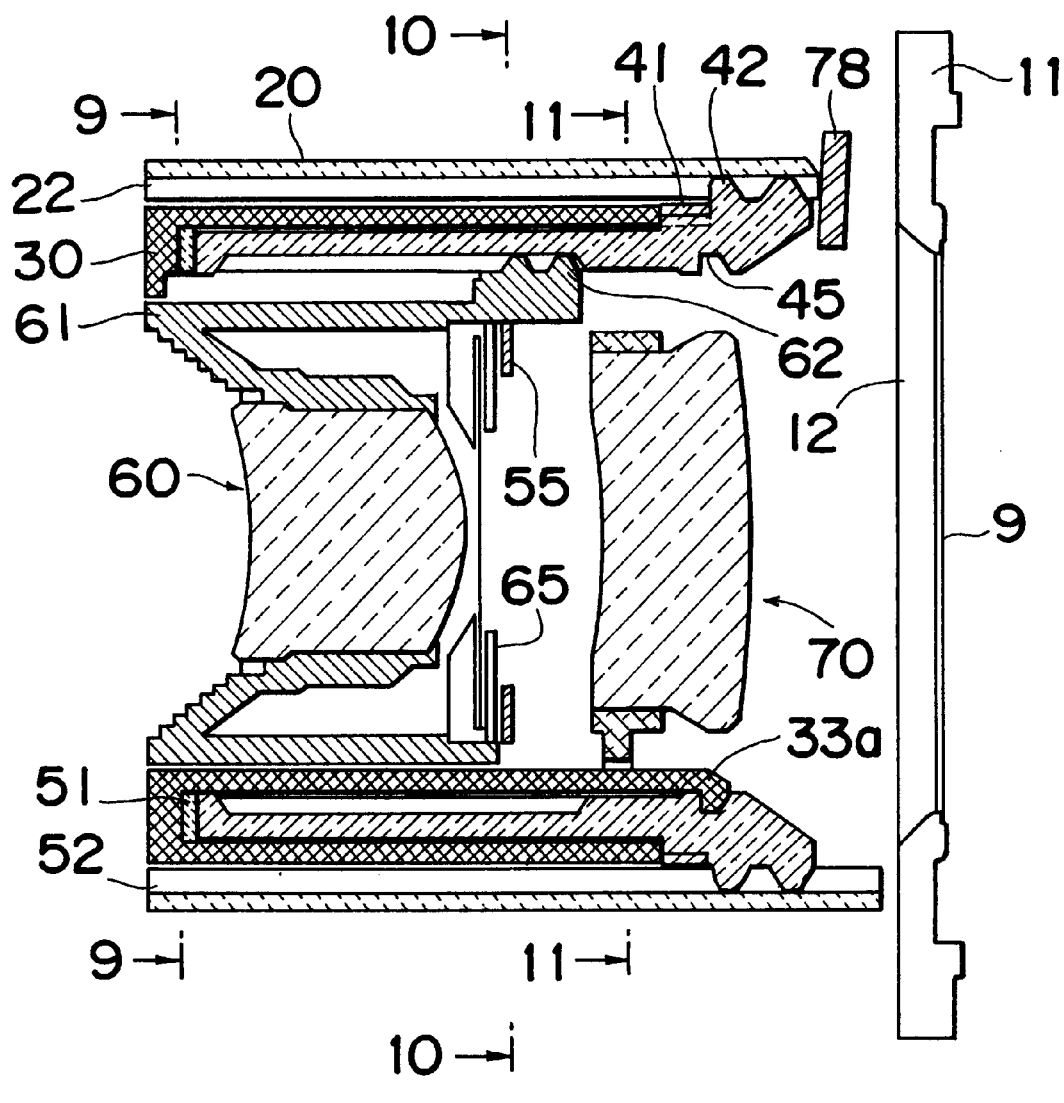
FIG. 3 is a vertical sectional view of the zoom lens barrel of the camera, in which the zoom lens barrel is in a retracting state (or retraction position) in which the zoom lens barrel is collapsed, or retracted, inside a camera body.
Figure 4:
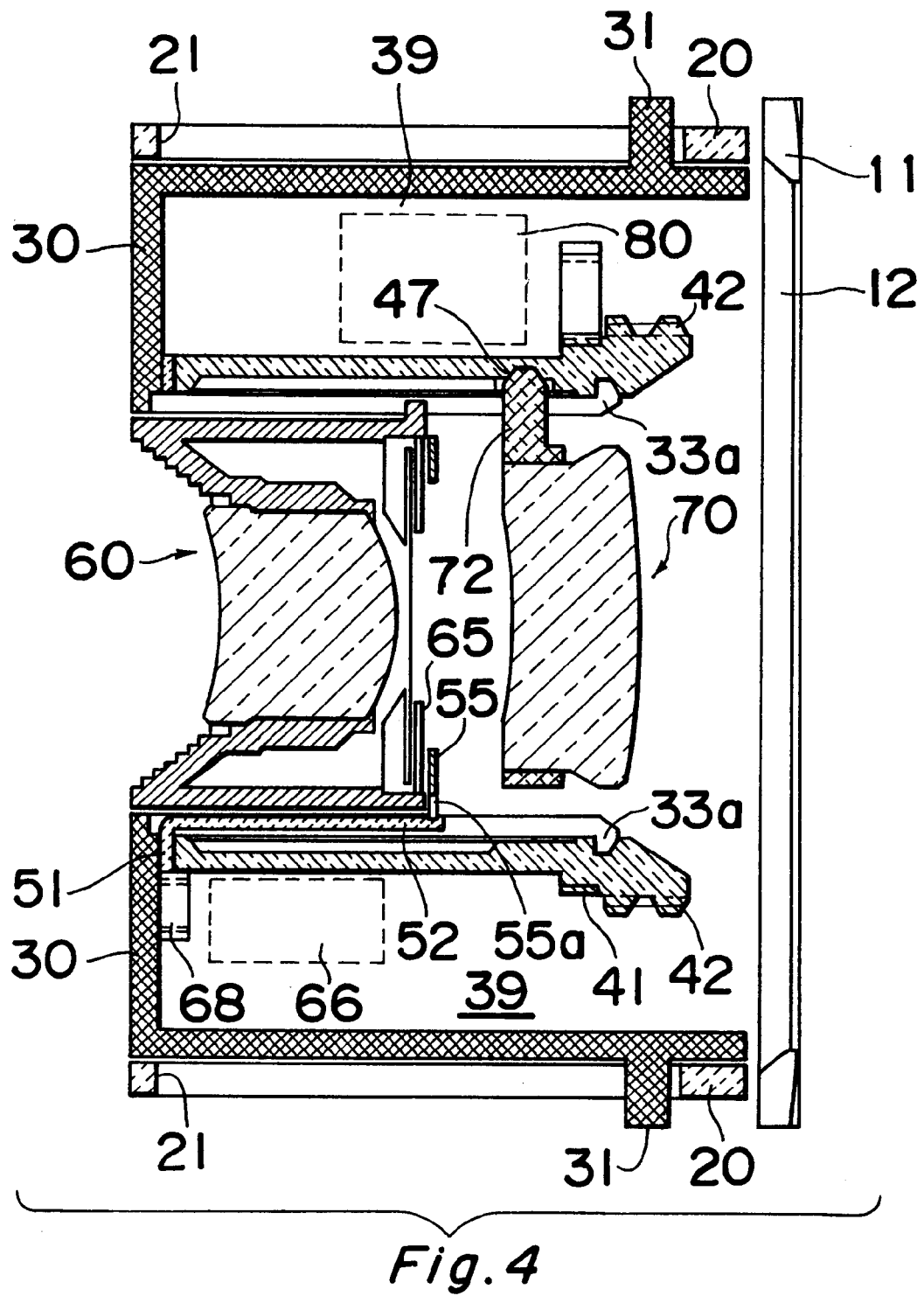
FIG. 4 is a horizontal sectional view of the zoom lens barrel of the camera, in which the zoom lens barrel is in the retracting state.
Figure 5:
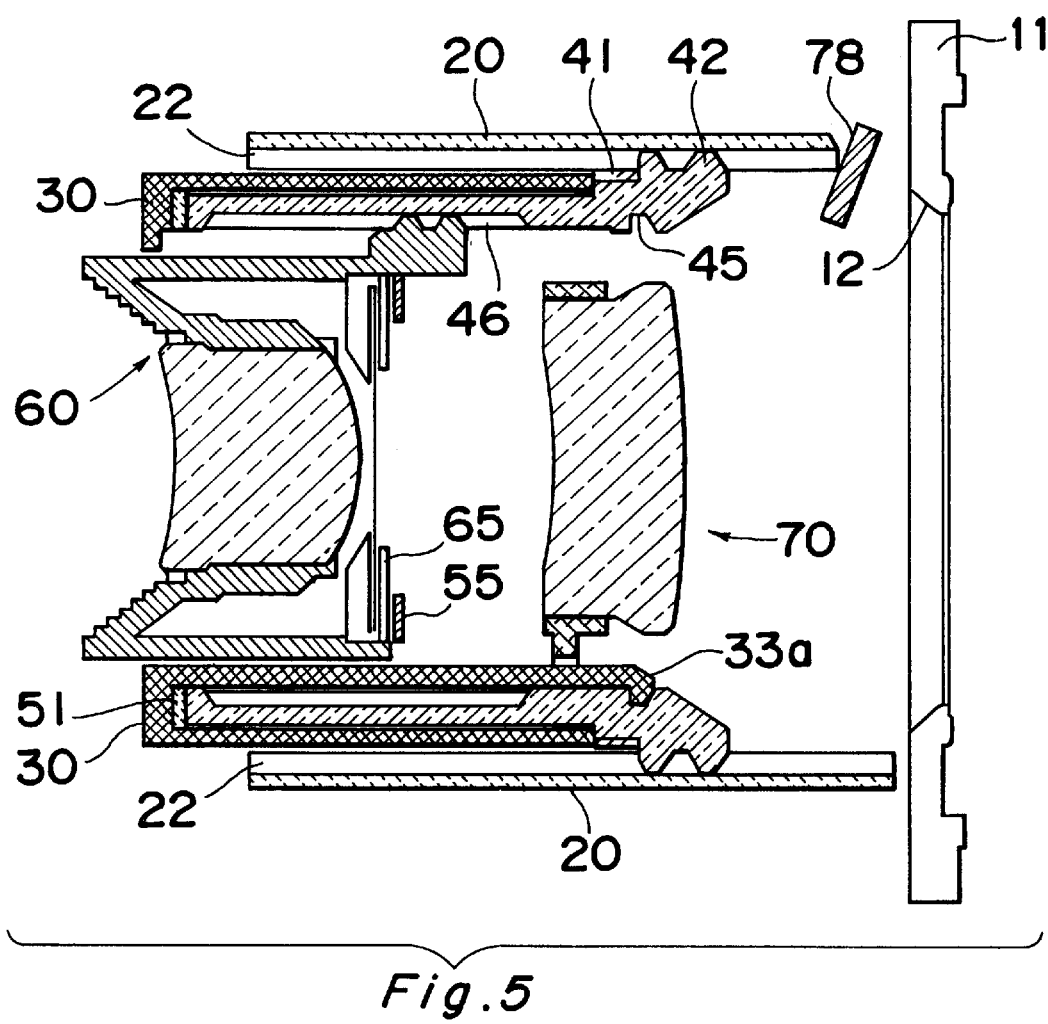
FIG. 5 is a vertical sectional view of the zoom lens barrel of the camera, in which the zoom lens barrel is in a state between the retracting state (or retracting position), and a projecting state (or projecting position) in which the zoom lens barrel projects outside most from the camera body.
Figure 6:
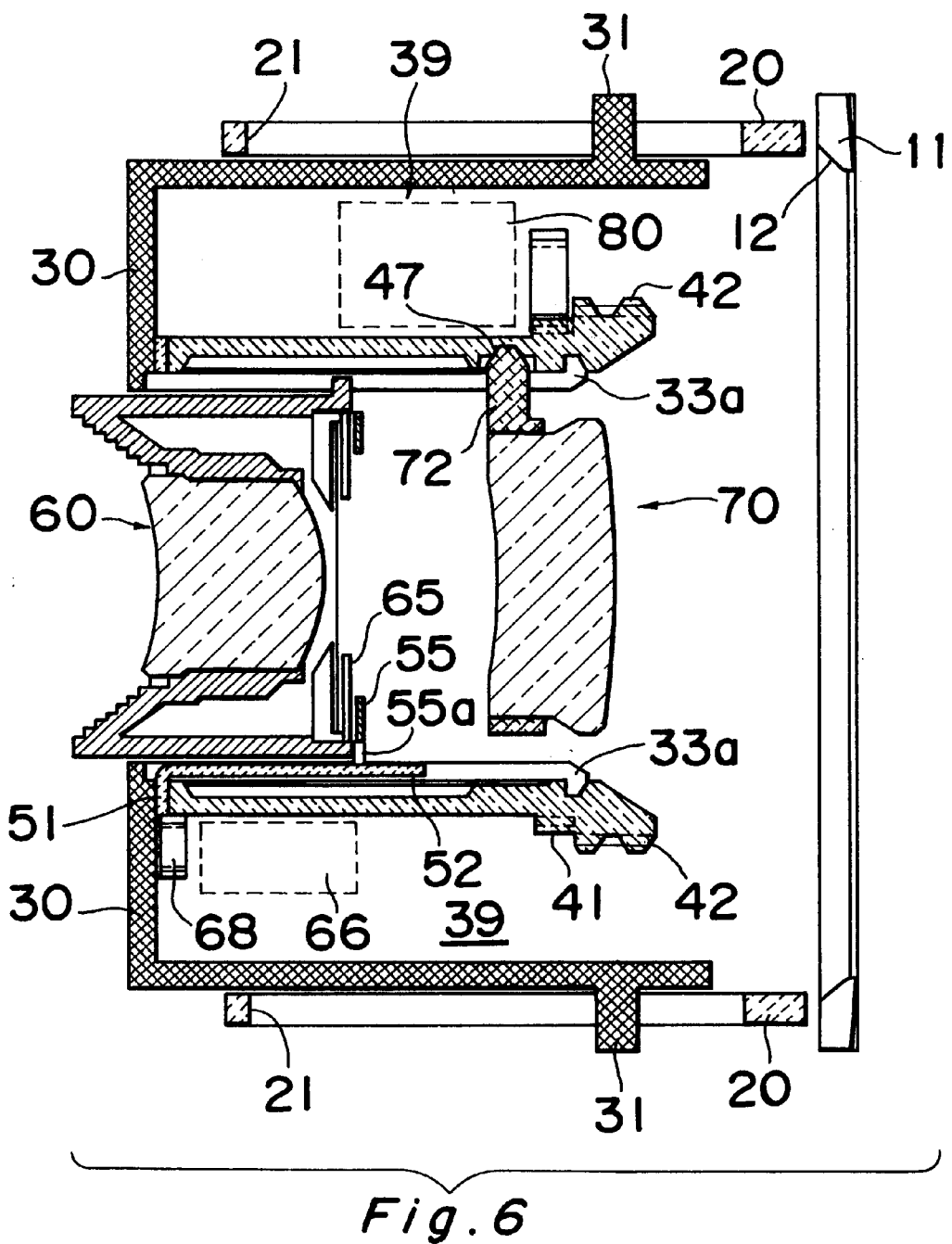
FIG. 6 is a horizontal sectional view of the zoom lens barrel of the camera, in which the zoom lens barrel is in the state between the retracting state and the projecting state.
Figure 7:
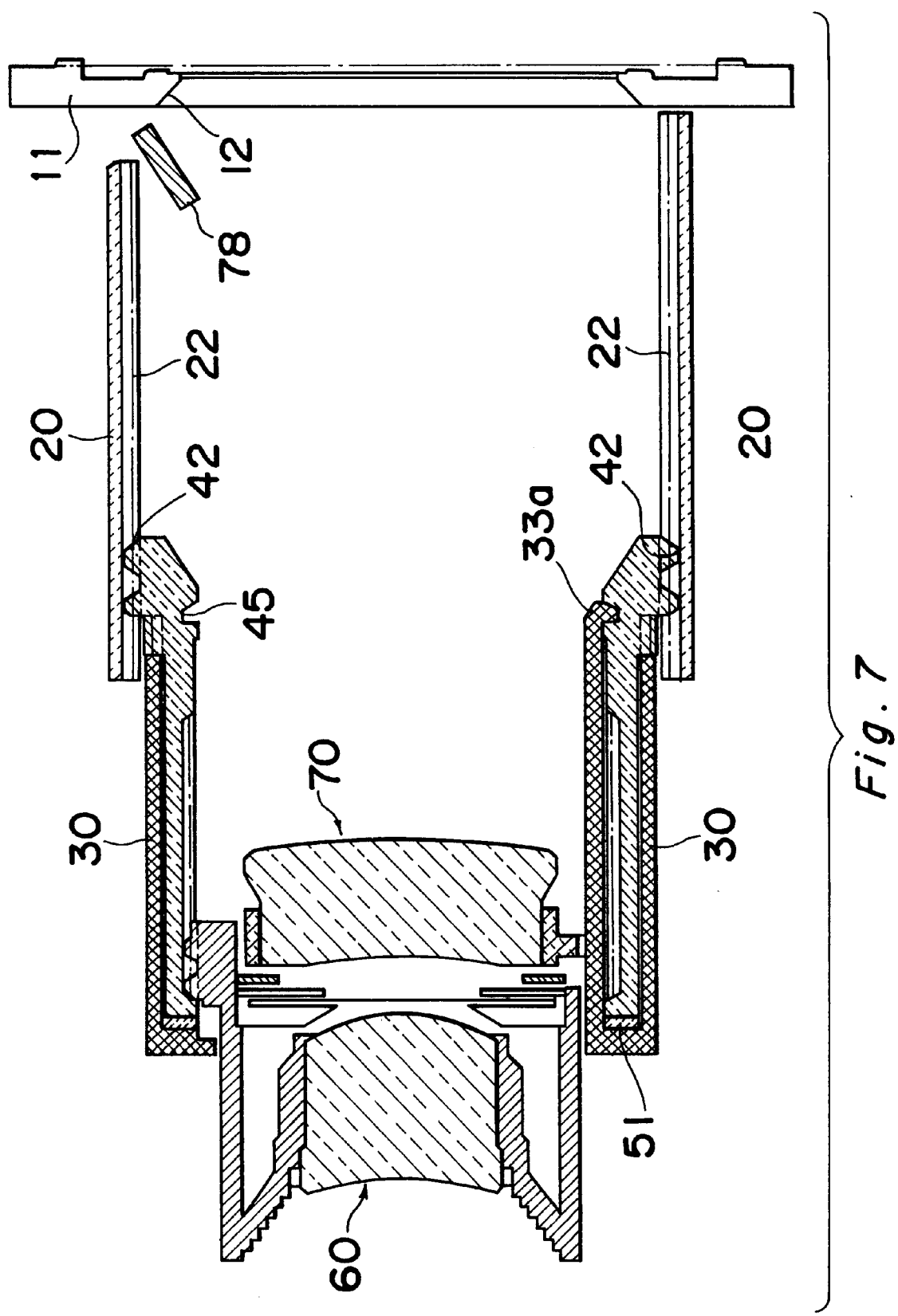
FIG. 7 is a vertical sectional view of the zoom lens barrel of the camera, in which the zoom lens barrel is in the projecting state.
Figure 8:
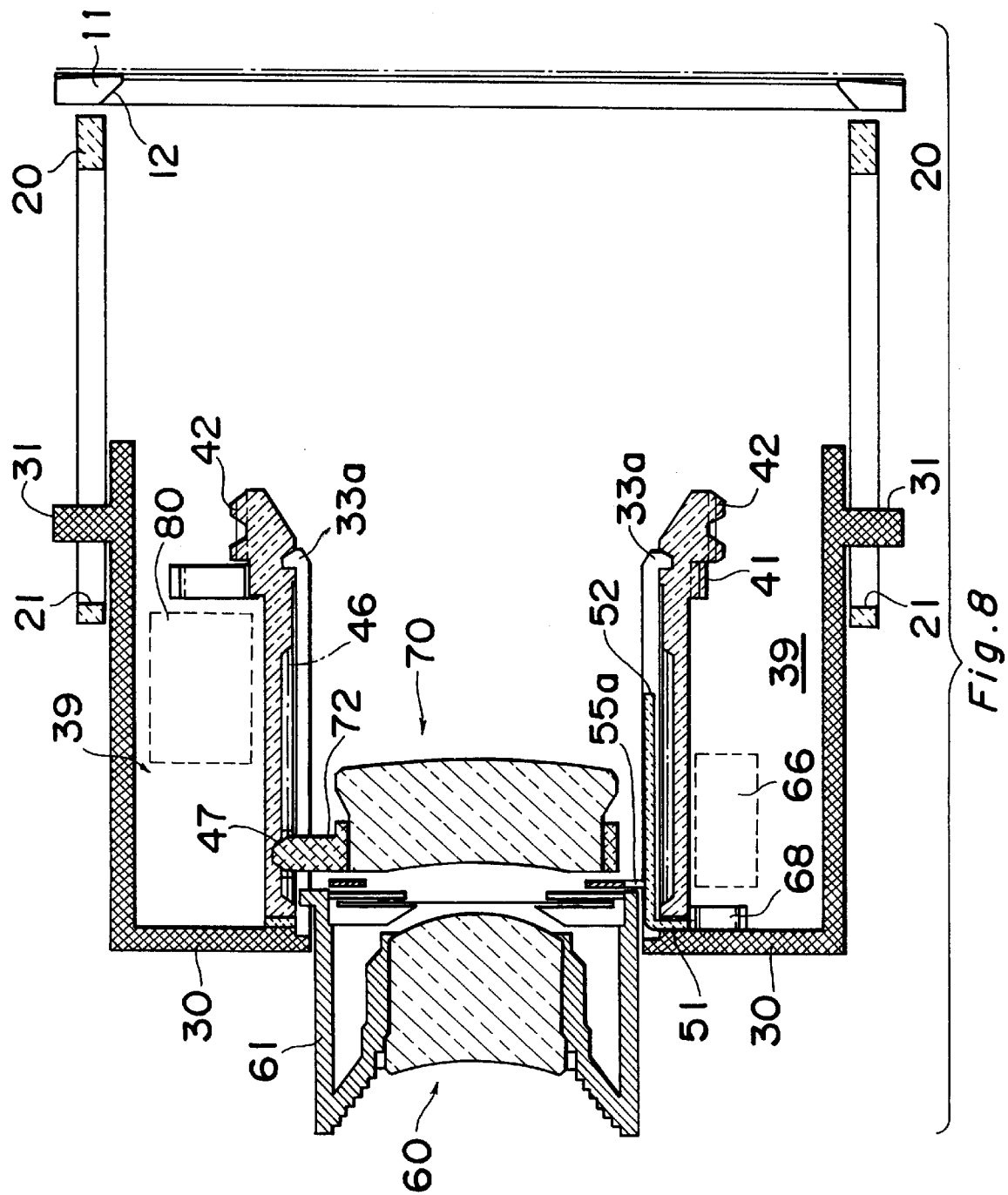
FIG. 8 is a horizontal sectional view of the zoom lens barrel of the camera, in which the zoom lens barrel is in the projecting state.

FIG. 1 is an exploded perspective view of a zoom lens barrel of a camera according to the preferred embodiment of the present invention; and FIG. 2 is a perspective view schematically showing the camera which is equipped with the zoom lens barrel of FIG. 1.

A stationary lens barrel 20 is a lens barrel a cross section of which is rectangular in shape, as shown in FIG. 2. The stationary lens barrel 20 is fixed to a picture frame 11 which is located on a front side of a film 9 (refer to FIG. 3) to be exposed within a camera body 8 (refer to FIG. 2 in which the camera body 8 is designated by an imaginary line). The stationary lens barrel 20 has a size, or dimension, which corresponds to a size, or dimension, of an exposure window 12 which forms on a picture frame 11. The picture frame 11 is provided on a front side of the film 9.

A movable lens barrel 30 (or first movable lens barrel) is a lens barrel a cross section of which is rectangular in shape, as shown in FIGS. 1 and 2. The movable lens barrel 30 slidably engages within the stationary lens barrel 20. A posture holding pin 31 is provided on each side of the movable lens barrel 30, and the stationary lens barrel 20 has a linear guide slot 21 formed in a direction of an optical axis on each side of the stationary lens barrel 20, in which each linear guide slot 21 engages slidably with each corresponding posture holding pin 31.

By the way, in a situation in which the zoom lens barrel of the camera is once assembled, the pair of posture holding pins 31 protrude beyond an outer surface of the stationary lens barrel 20, and tip portions, thus protruding beyond the outer face thereof, of the pins 31 are supported by a support arm 75 as a movable barrel posture holding jig, respectively. The support arm 75 has a right arm portion 76 and a left arm portion 77, where the right arm portion 76 and the left arm portion 77 are coupled together to each other with a stay 78. The stay 78 is rotatable about its longitudinal axis. Both arm portions 76, 77 extend from both ends of the stay 78 in a direction perpendicular to the longitudinal axis of the stay 78, in which the arm portions 76, 77 extend in the same direction relative to each other. The arm portions 76, 77 have slots 76a, 77a, respectively, formed near end portions, opposite the stay 78, thereof in their longitudinal directions, in which the posture holding pins 31 slide inside these slots 76a, 77a, respectively.

While the movable barrel 30 is sliding in the direction of the optical axis, the pins 31 are supported by the support arm 75. Therefore, the posture of the movable barrel 30 is kept in position during the sliding motion.

By the way, when the movable lens barrel 30 slides in the direction of the optical axis, it is necessary to feed in and out the movable lens barrel 30 relative to the stationary lens barrel 20 while a center of axis of the movable lens barrel 30 is kept coincident with a center of axis of the stationary lens barrel 20. This mechanism will be described in detail later.

An opening portion 32, serving as a light receiving portion of the zoom lens barrel, is provided on a front face of the first movable lens barrel 30. Around the opening portion 32, there are provided three linear guide portions 33 which project towards a photographer (i.e. a photographer-side), in which the linear guide portions 33 are formed around the opening portion 32 at generally equal interval to each other.

More specifically, these linear guide portions 33 are placed so as to be included within a same cylindrical surface. These linear guide portions 33 are fundamentally intended to guide a linear movement of a first lens group 60 and a second lens group 70, described in detail later, in the direction of the optical axis, but each of these linear guide portions 33 also serves as a drive lens barrel support member for rotatably supporting a drive lens barrel 40 which is mounted inside the movable lens barrel 30.

The drive lens barrel 40 is fitted around the three linear guide portions 33 from outside of the three linear guide portions 33 so that the three linear guide portions 33 are positioned inside the drive lens barrel 40. In the arrangement, the drive lens barrel 40 is rotatable relative to the movable lens barrel 30. Also, an engaging hook portion 33a formed at a tip portion of each linear guide portion 33, engages with an annular groove 45 (see FIG. 3) which is formed on an inner circumferential surface of the drive lens barrel 40. Therefore, the drive lens barrel 40 is unable to move relative to the movable lens barrel 30 in the direction of the optical axis. That is, the movable lens barrel 30 and the drive lens barrel 40 move together in the direction of the optical axis.

On an end portion on a photographer-side of the drive lens barrel 40, are formed a gear portion 41 and a helicoid 42. More specifically, the helicoid 42 is provided on a rear side of a body of the drive lens barrel 40, and the gear portion 41 is provided on a front side relative to the helicoid 42, as well shown in FIG. 1.

The gear portion 41 on the front side is a driving gear that receives a driving force from a speed reduction system which is driven by a drive motor 80 as an electric component (see FIGS. 4, 6, 8, 9, 10 and 11).

In addition, the helicoid 42 with a diameter larger than a diameter of the gear portion 41, engages with a helicoidal portion 22 which is formed on an upper-side inner surface of the stationary lens barrel 20 and on a lower-side inner surface thereof. That is, when the drive lens barrel 40 rotates relative to the movable lens barrel 30 upon receiving the driving force at its gear portion 41, the helicoid 42 of the drive lens barrel 40 slidably engages with the helicoidal portions 22 of the stationary lens barrel 20. As a result, the drive lens barrel 40 moves back or forth relative to the stationary lens barrel 20, while the drive lens barrel 40 rotates relative to the stationary lens barrel 20.

As apparent from the above explanation, when the drive lens barrel 40 is rotated by the drive motor 80 mounted inside the zoom lens barrel, the drive lens barrel 40 moves back and forth relative to the stationary lens barrel 20 in the direction of the optical axis while the drive lens barrel 40 rotates within the movable lens barrel 30.

In this embodiment, the movable lens barrel 30 is constructed as a member which has a rectangular cross section, and the drive lens barrel 40 is constructed as a member which has a circular cross section. Namely, there is mounted the drive motor 80 as the electric component, in a space 39 which is thus formed between these members 30 and 40, by which construction the compactness or miniaturization of a whole size, or dimension, of the camera is realized. This space 39 does not appear in the vertical sectional view, as in FIG. 5, of the zoom lens barrel, but this space 39 appears in the horizontal sectional view as in FIGS. 4, 6 and 8.

Figure 17:
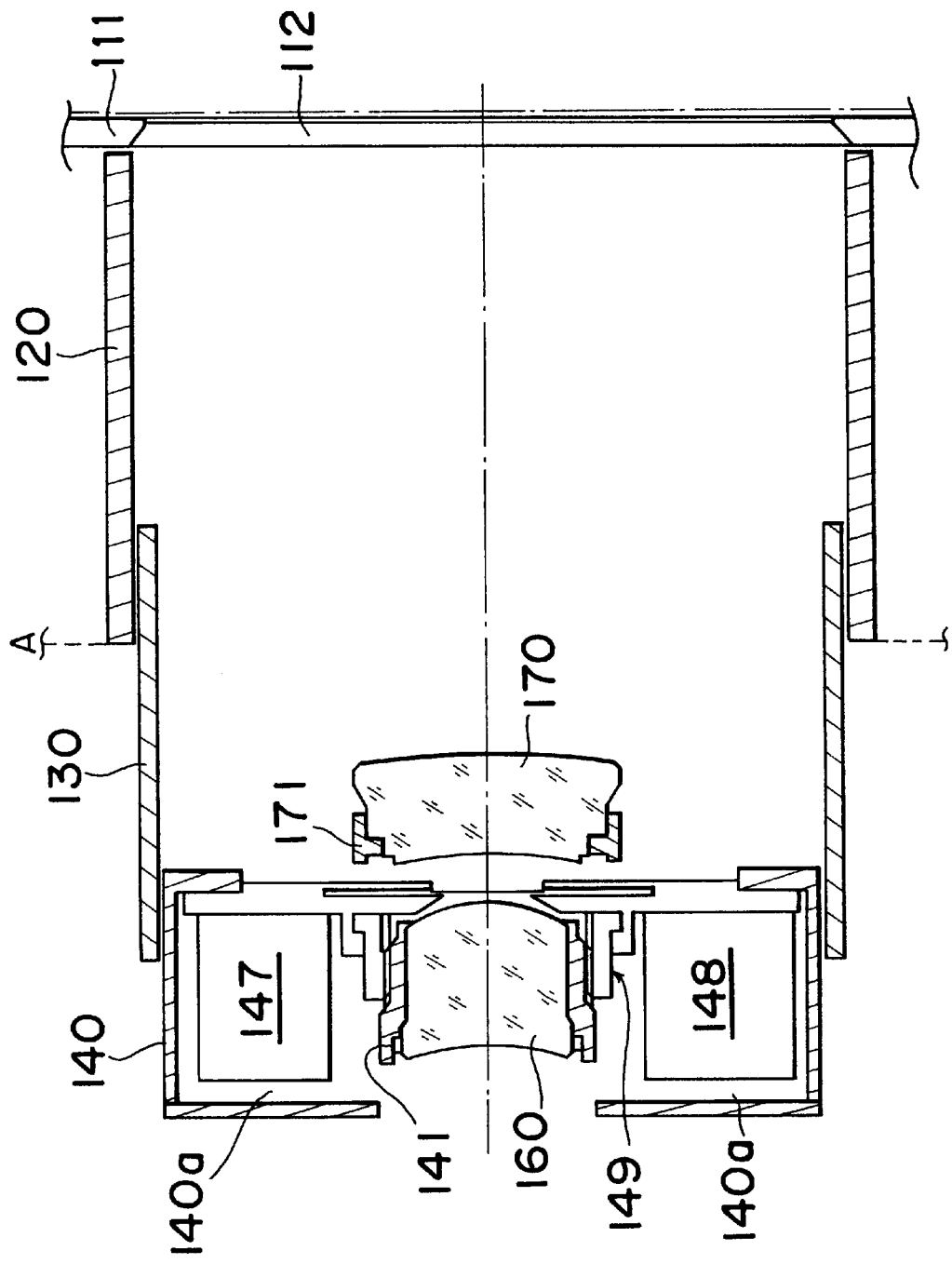
FIG. 17 is a horizontal sectional view of the zoom lens barrel of FIG. 15.

Now, in comparing the conventional zoom lens barrel as shown in FIG. 17 and the zoom lens barrel of the preferred embodiment with each other, the following point will be clear.

That is, according to the conventional zoom lens barrel, the electric component (for example, the focusing motor 148) is arranged within the forefront movable lens barrel 140 (see FIG. 17) that is farthest from the camera body, out of the three lens barrels 120, 130, 140, in the telephoto state. On the other hand, according to the zoom lens barrel of the preferred embodiment, the electric component of the electric drive motor 80 is arranged within the first movable lens barrel 30 which is relatively closer to the camera body in the telephoto state (see FIG. 8). Namely, the first movable lens barrel 30 does not locate as a forefront lens barrel in the telephoto state.

Accordingly, the wiring, or arrangement, of the electric wire(s) extending from the camera body side to the electric components (i.e. electric drive motor 80 inside the zoom lens barrel) becomes relatively easier, as compared with the wiring, or arrangement, thereof arranged in the conventional zoom lens barrel of the camera.

More specifically, the space 39 is a space which is formed between the first movable lens barrel 30 having the rectangular cross section and the drive lens barrel 40 having the circular cross section, as explained above. Therefore, the space 39 can also be regarded as a space which is formed between the first movable lens barrel 30 and a second movable lens barrel 61 for holding a first lens group 60, as is explained in detail later, where the second movable lens barrel 61 is mounted inside the first movable lens barrel 30. Namely, the space 39 can be regarded as the space which is inside the first movable lens barrel 30 and is outside the second movable lens barrel 61 in a state in which the second movable lens barrel 61 is housed inside the first movable lens barrel 30.

The first movable lens barrel 30, which is rectangular in cross section as already described, slides within the stationary lens barrel 20 which is also rectangular in cross section. In order to make the first movable lens barrel 30 slide accurately with respect to the stationary lens barrel 20 while keeping alignment between a center of axis of the first movable lens barrel 30 and a center of axis of the stationary lens barrel 20, it is necessary to restrain (or restricted) both its relatively parallel eccentricity and its relative inclination of the first movable lens barrel 30 with respect to the stationary lens barrel 20. The mechanism for satisfying the necessity to restrict them is explained below.

First, the relatively parallel eccentricity is restrained or limited, as follows.

The posture holding pins 31 provided on both side faces of the first movable lens barrel 30 are engaged with the guide slots 21 formed on both side faces of the stationary lens barrel 20, in which the guide slots 21 are formed in the direction of the optical axis. With this arrangement, the first movable lens barrel 30 is prevented from decentering parallel to a vertical direction with respect to the stationary lens barrel 20.

Also, as best shown in FIG. 1, a contact portion 34 protruding like a flat-plate is provided near the posture holding pin 31 on each side of the first movable lens barrel 30, respectively. With the contact portion 34 contacting an inner surface of the stationary lens barrel 20, the first movable lens barrel 30 is prevented from decentering parallelly in a direction horizontal with respect to the stationary lens barrel 20.

Next, the aforementioned relative inclination is restrained or limited, as follows.

That is, the helicoid 42 of the drive lens barrel 40, which is held within the first movable lens barrel 30, engages with the helicoids (or helicoid portions) 22 formed on the upper and lower inner surfaces of the stationary lens barrel 20. With the mechanism, the inclination of the first movable lens barrel 30 within a vertical plane is restrained or limited.

Also, the posture holding pins 31 protruding from both side faces of the first movable lens barrel 30 engage with shots 76a, 77a formed on both arm portions 76, 77 of the support arm 75. With the mechanism, the inclination of the first movable lens barrel 30 within a horizontal plane is restrained or limited.

Namely, the helicoid 42 of the drive lens barrel 40 is restrained, or held in position, by the upper and lower surfaces of the stationary lens barrel 20 (i.e. the helicoid 42 is restrained, or held in position, at two locations which are separate from each other with some distance therebetween in a first direction perpendicular to the direction of the optical axis); at the same time, the pins 31 on both sides of the first movable lens barrel 30 are restrained by the opposite two arm portions 76, 77 of the support arm 75 (i.e. likewise, the first movable lens barrel 30 is restrained, or held in position, at two locations which are separate from each other with some distance therebetwen in a second direction which is perpendicular to the direction of the optical axis and is perpendicular to the first direction).

Figure 15:
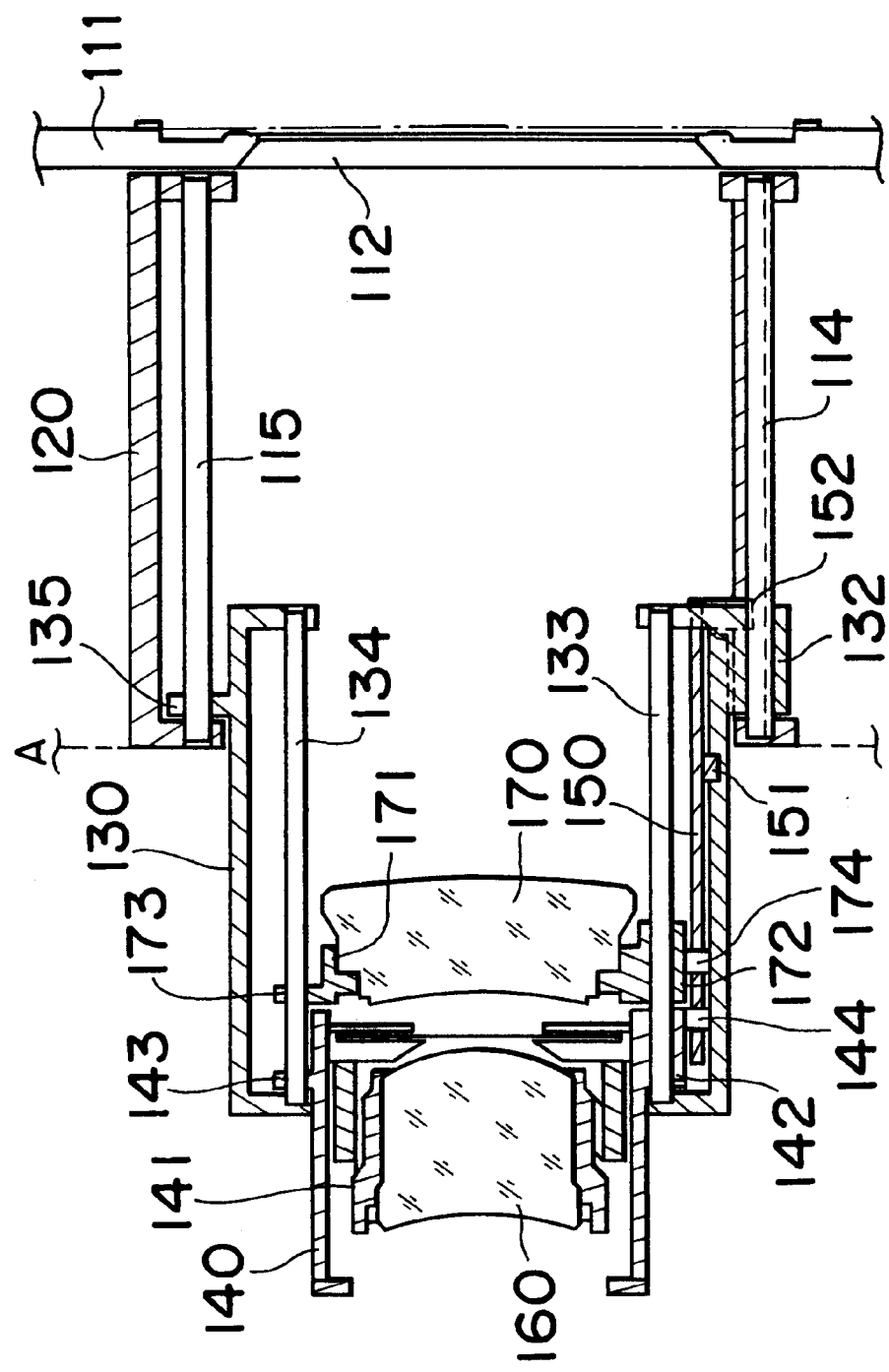
FIG. 15 is a vertical sectional view showing a conventional collapsible type of zoom lens barrel which is constituted by a combination of a plurality of rectangular lens barrels, in which the zoom lens barrel is in a telephoto state.
Figure 16:
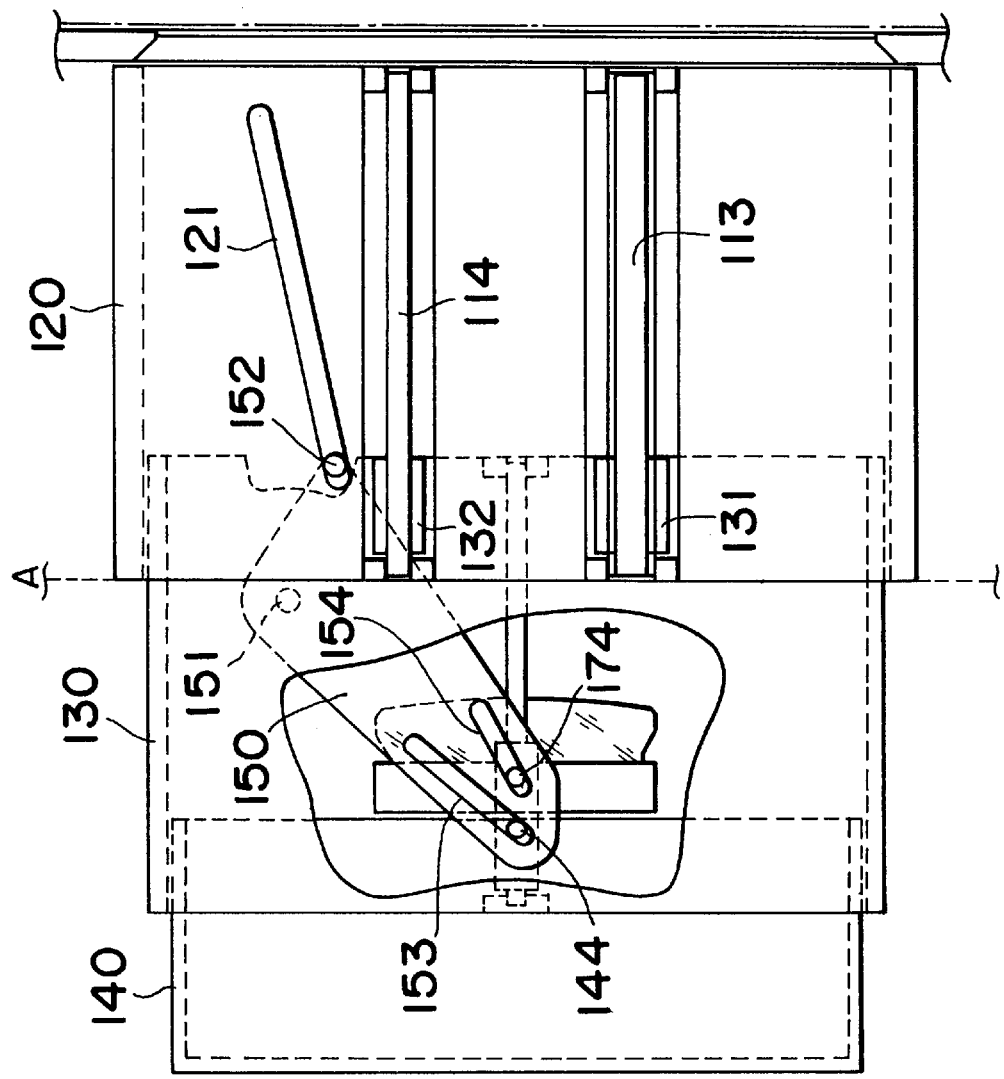
FIG. 16 is a partly cut-out view of the zoom lens barrel of FIG. 15, as viewed from a lower face side thereof.

Consequently, in contrast with the conventional zoom lens barrel as shown in FIGS. 15 to 17, it is possible to make the first movable lens barrel 30 slide relative to the stationary lens barrel 20 with a relatively larger span in the direction of the optical axis while keeping its posture with a relatively higher accuracy.

In other words, the conventional zoom lens barrel, as shown in FIGS. 15 to 17, in which a plurality of lens barrels rectangular in cross section are fitted one over another telescopically, requires the following construction, or mechanism, in order to keep the posture of the lens barrels.

That is, in order to keep the posture thereof, the sleeve-like members 132, 142, 172, which are fixed to the movable lens barrels 130, 140 and to the lens frame 171, respectively, are fitted to the guide bars 114, 133 which extend in the direction of the optical axis, and there are installed the rotation inhibiting bars 115, 134 for preventing the individual movable lens barrels 130, 140 from rotating about the guide bars 114, 133.

According to the mechanism of the conventional zoom lens barrel, in order to enhance the precision to keep the posture thereof in position, each of the sleeve-like members 132, 142, 172 requires to be made longer in the direction of the optical axis. However, if the sleeve-like members 132, 142, 172 are made longer, there arises a problem that it is difficult to secure a longer span of each of the sleeve-like members 132, 142, 172 in the direction of the optical aaxis.

Namely, according to the mechanism of the conventional zoom lens barrel, it is difficult to make the individual movable lens barrels slide over such longer spans in the direction of the optical axis while their posture is kept in position with a higher accuracy.

In contrast with this conventional mechanism of the zoom lens barrel, according to the aforementioned mechanism of the preferred embodiment, the first movable lens barrel 30 is held, or restricted, at two locations which are separate from each other with some distance therebetween in the directions perpendicular to the direction of the optical axis in both vertical and horizontal directions, and the distance between the locations corresponds to the length of the sleeve-like members extending in the direction of the optical axis of the conventional zoom lens barrel. The distance therebetween in the preferred embodiment is much longer than the length of each of the conventional sleeve-like members in the direction of the optical axis. In addition, both the helicoid 42 of the drive lens barrel 40 and the pins 31 protruding from both faces of the first movable lens barrel 30, have a small distance, or length, in the direction of the optical axis.

With this mechanism, therefore, the movable lens barrel 30 can be slid over a relatively larger span in the direction of the optical axis while keeping in posture with a higher accuracy, in contrast with the mechanism of the conventional zoom lens barrel.

In the preferred embodiment, as will be described later, it is also possible to make an effective use of the support arm 75 for driving a mechanism part (or structural part) provided on a side of the camera body, in linkage with advancement and retreat of the zoom lens barrel.

Inside the drive lens barrel 40, the first lens group 60 and the second lens group 70 are disposed. A helicoid 62 is provided on a photographer-side end portion of a body of the second movable lens barrel 61 holding the first lens group 60, and this helicoid 62 is engaged with a helicoid 46 which is formed on an inner circumferential surface of the drive lens barrel 40. As can be illustrated in the sectional view of FIG. 9, the helicoid 62 is divided into three helicoid portions 62a, 62b, 62c along its circumferential direction of the second movable lens barrel 61. The linear guide portions 33 of the first movable lens barrel 30 engage with corresponding engaging recessed portions which are formed between the three helicoid portions 62a, 62b, 62c, respectively.

According to the arrangement, these engaging recessed portions are unrotatably engaged with the linear guide portions 33 fixed to the first movable lens barrel 30, respectively. Therefore, when the drive barrel 40 rotates relative to the first movable lens barrel 30 (therefore, also relative to the stationary lens barrel 20), the first lens group 60 held by the second movable lens barrel 61 moves relative to the drive lens barrel 40 (also, simultaneously relative to the stationary lens barrel 20) in the direction of the optical axis, due to the engagement relation between the helicoid 62 of the second movable lens barrel 61 and the helicoid 46 of the drive lens barrel 40.

Figure 9:
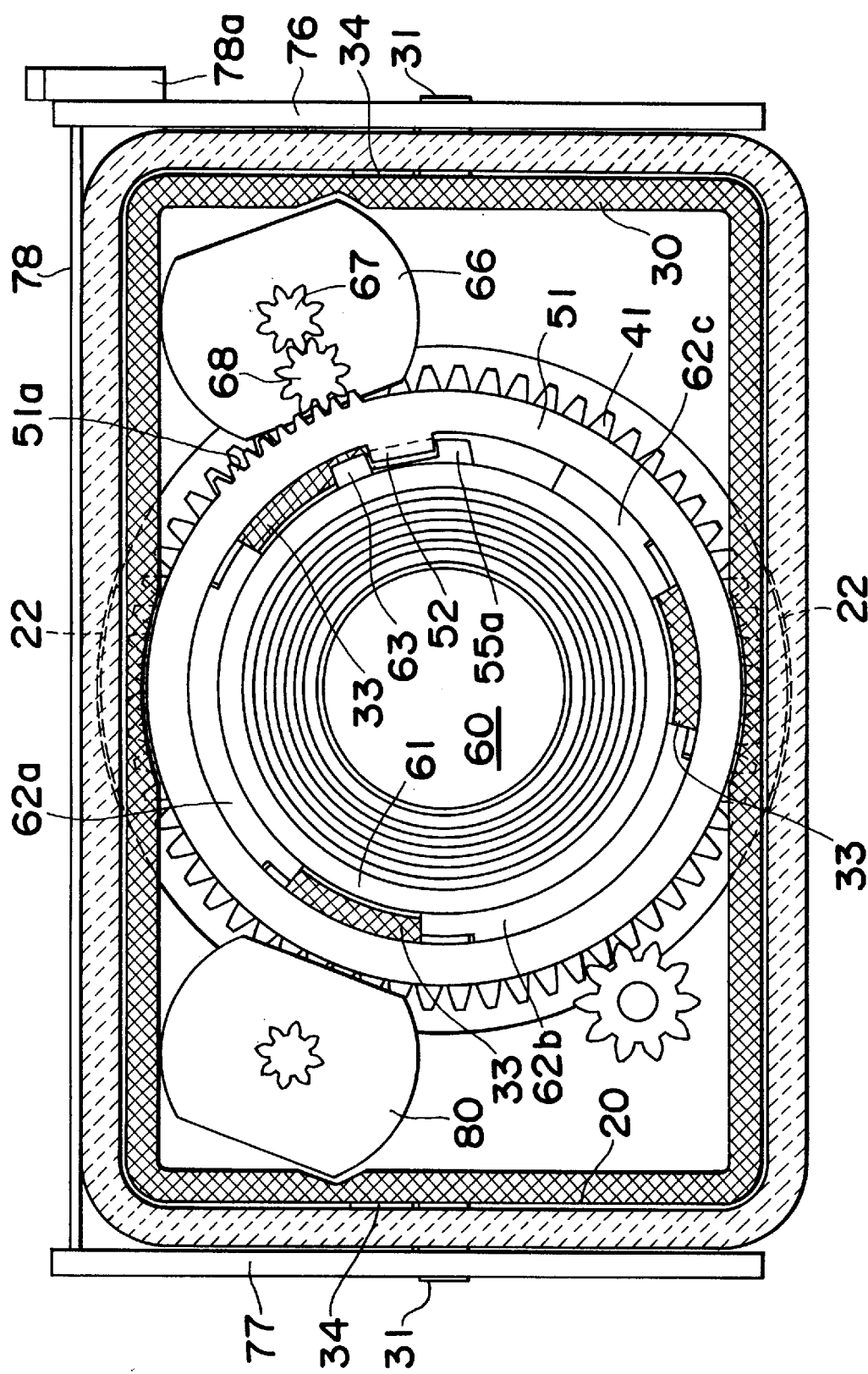
FIG. 9 is a sectional view taken along the line 9—9 of FIG. 3.

In addition, two engaging recessed portions, shown in a left-side upper part and a middle lower part in FIG. 9, out of the three recessed portions forming between the three helicoid divisional portions 62a, 62b, 62c of the helicoid 62, engage with the corresponding linear guide portions 33 of the first movable lens barrel 30. In addition, the engaging recessed portion that appears in a right-side upper part in FIG. 9, is segmented into two recessed portions 63a and 63b by a protrusion 63 (see FIG. 1). One 63a of the two recessed portion 63a, 63b functions as an engaging recessed portion with which one linear guide portion 33 engages. The other 63b of the two recessed portion 63a, 63b serves to define a range over which an engaging recessed portion 55a provided on an outer circumference of a shutter driving ring 55, described later, is permitted to rotate.

On an outer circumferential surface of a lens frame 71 for holding the second lens group 70, are provided three pins 72 projecting outwardly radially. These pins 72 engage with cam grooves 47 which are formed on an inner circumferential surface of the drive lens barrel 40.

Figure 11:
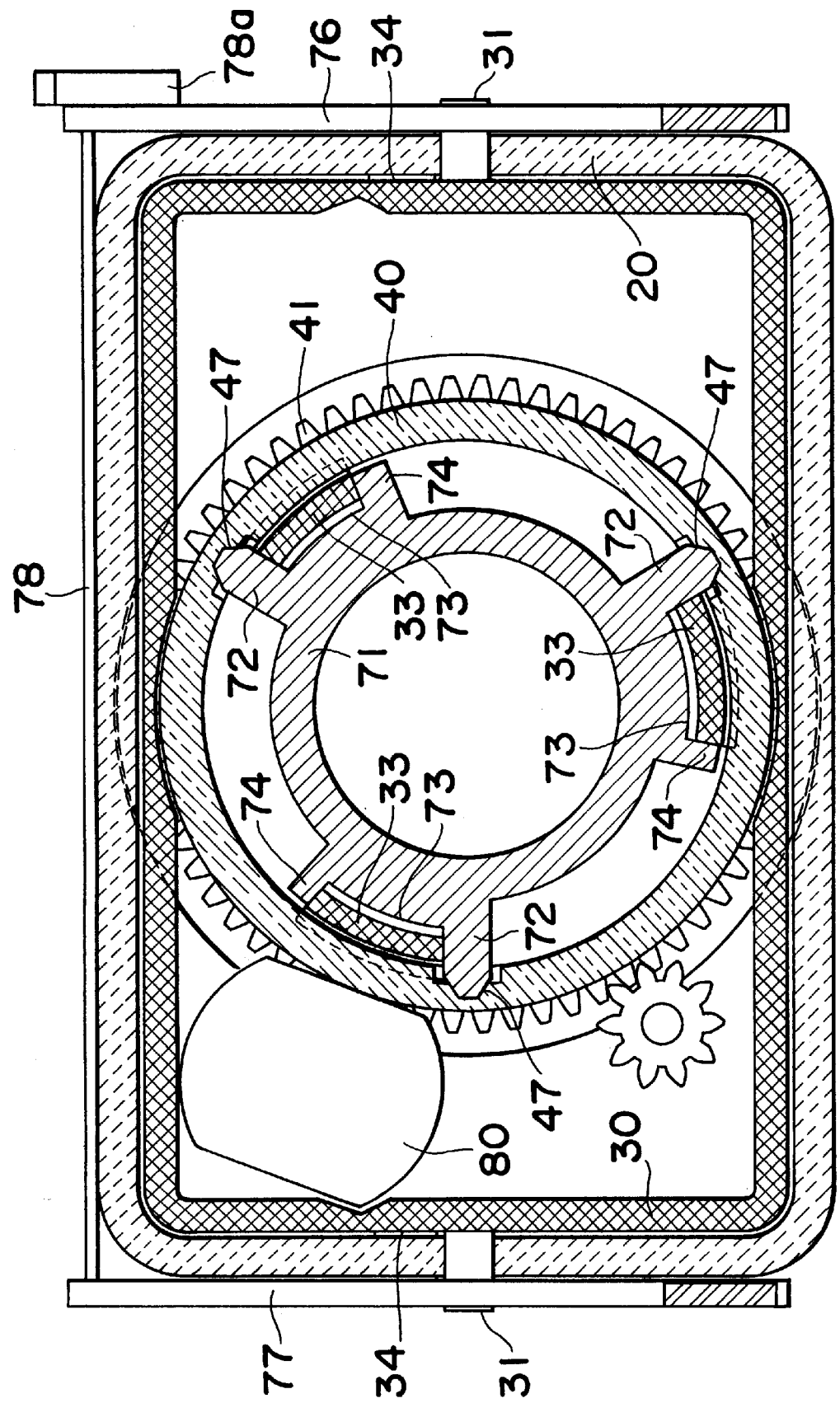
FIG. 11 is a sectional view taken along the line 11—11 of FIG. 3.

Meanwhile, as shown in the sectional view of FIG. 11, the lens frame 71 for holding the second lens group 70 has an outer surface on which there are provided three engaging recessed portions 73 engaging with the linear guide portions 33 of the movable barrel 30. Each of the engaging recessed portions 73 is composed of a pin 72 and a protrusion 74 adjacent to the pin 72.

According to the mechanism, the engaging recessed portions 73 are engaged unrotatably relative to the linear guide portions 33 of the first movable lens barrel 31. Therefore, when the drive lens barrel 40 rotates relative to the first movable lens barrel 30 (therefore, also relative to the stationary lens barrel 20), the second lens group 70 is moved relative to the drive lens barrel 40 (also, simultaneously relative to the stationary lens barrel 20) in the direction of the optical axis, due to the mutual engagement between the pin 72 and the cam grooves 47 formed on the inner surface of the drive lens barrel 40.

Figure 10:
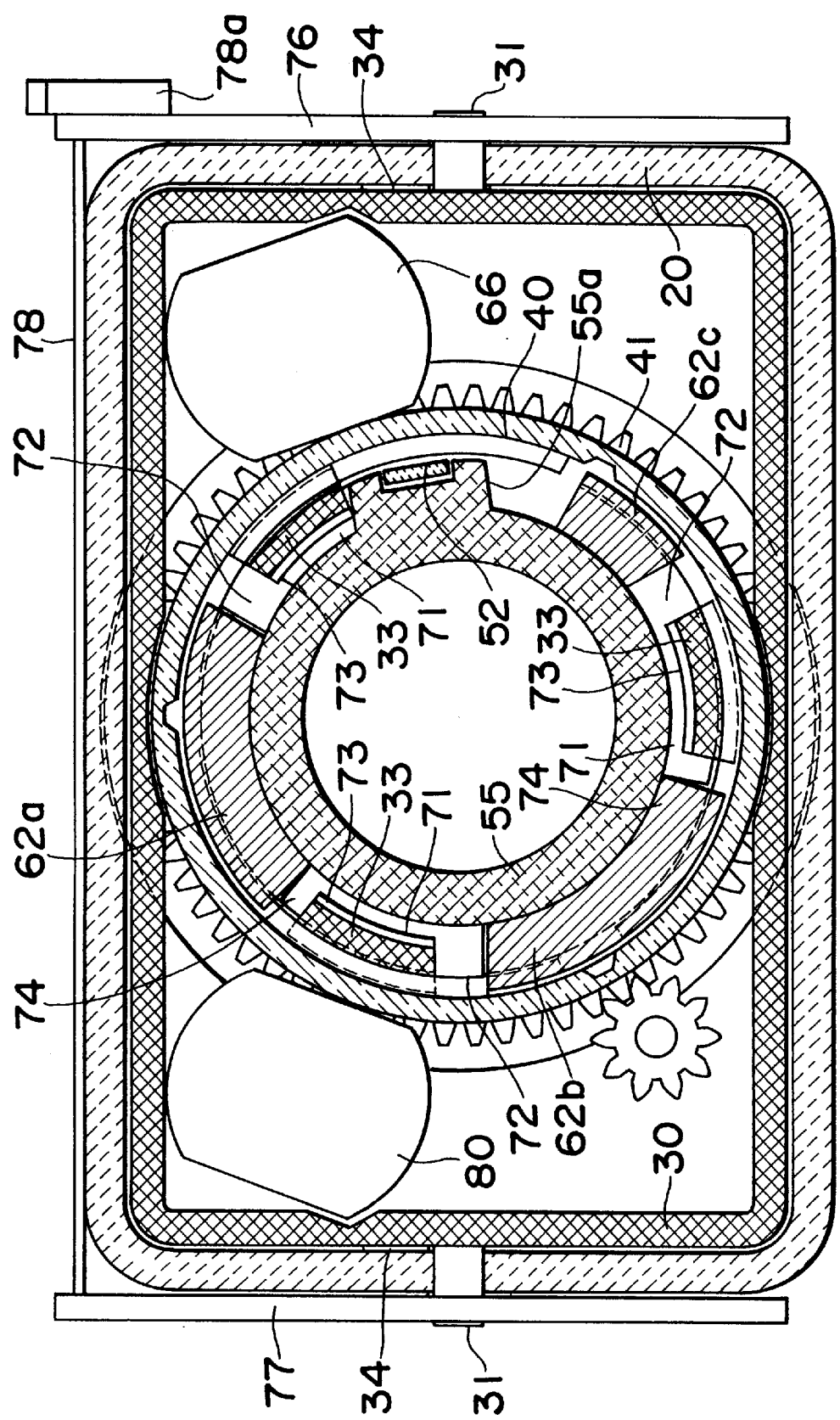
FIG. 10 is a sectional view taken along the line 10—10 of FIG. 3.

Meanwhile, as is understood from a comparison between the two sectional views of FIG. 9 and FIG. 10, the helicoid divisional portions 62a, 62b, 62c, or the protrusion 63, of the second movable lens barrel 61 for holding the first lens group 60 contact with both side faces of each of the three linear guide portions 33 in FIG. 9. On the other hand, no part of the second movable lens barrel 61 contacts with the linear guide portions 33. Instead, the pin 72 and the protrusion 74 of the lens frame 71 for holding the second lens group 70 contacts with both side faces of the linear guide portion 33 in FIG. 10.

That is, each of the engaging recessed portions between the helicoid divisional portions 62a, 62b, 62c of the second movable lens barrel 61, although not shown clearly in FIG. 1, has a stepped construction, or configuration, so that the circumferential width of each of the engaging recessed portions increases towards the rear side of the camera (i.e. towards the photographer) in the direction of the optical axis. Each of the engaging recessed portions with the larger circumferential width of the second movable lens barrel 61 functions as an escape, or relief, of the second lens group 70 when the first lens group 60 and the second lens group 70 approach to each other in the telephoto state.

That is, the pin 72 and the protrusion 74 of the lens frame 71 of the second lens group 70 enter into the engaging recessed portions with the larger circumferential width of the second movable lens barrel 61 while keeping in contact with both side faces of the linear guide portions 33, respectively. This corresponding state is shown in FIG. 10.

In the embodiment, a pair of lens groups 60 and 70 are held inside the drive lens barrel 40. However, the present invention is not limited to this embodiment. Namely, the number of the lens group(s), held inside the drive lens barrel 40, can be one or more than two.

Referring to FIG. 1, a reference numeral 50 denotes a shutter driving key, and 55 denotes a shutter driving ring. The shutter driving ring 55, as shown in the sectional views of FIGS. 3 to 8, is connected to a shutter mechanism part 65 which is mounted on a rear end portion of the first lens group 60. In the arrangement, when the shutter driving ring 55 is driven with a shutter driving key 50, the shutter mechanism part 65 is actuated.

More specifically, the shutter driving key 50 is constituetd by a ring member 51 and a rod-shaped key member 52 which is fixed to the ring member 51. The ring member 51, as shown in the sectional views of FIGS. 3 to 8, is rotatable around the three linear guide portions 33, between a forefront face of the drive barrel 40 and an inner surface of a forefront wall of the first movable lens barrel 30, in which the ring member 51 is immovable relative to the three linear guide portions 33 in the direction of the optical axis.

As shown in the sectional view of FIG. 9, a gear portion 51a is partly formed along an outer circumference of the ring member 51. In the arrangement, a driving force from a pinion 67, which is fixed to a driving shaft of a shutter drive motor 66, is transferred to the gear portion 51a via an intermediate gear 68. The rod-shaped key member 52 linearly extends in the direction of the optical axis from the ring member 51 towards the photographer, and the rod-shaped key member 52 is connected to the shutter driving ring 55, which is rotatably mounted on the shutter mechanism part 65 and which is immovable relative to the shutter mechanism part 65 in the direction of the optical axis for the purpose of opening and closing of the shutter.

The shutter driving ring 55 has an outer circumference a part of which has the aforementioned engaging recessed portion 55a. In the arrangement, the rod-shaped key member 52 is engaged with the engaging recessed portion 55a. Therefore, when the first lens group 60 integrated with the shutter mechanism part 65 is moved in the direction of the optical axis relative to the drive lens barrel 40 for a zooming operation, the rod-shaped key member 52, which has a predetermined length, is not disengaged from the engaging recessed portion 55a of the shutter driving ring 55. Therefore, the mutual connection between the engaging recessed portion 55a and the rod-shaped key member 52 is assured over a whole zooming range in their mutual movement. That is, over the whole zooming range, when the shutter driving key 50 is rotated by the shutter drive motor 66, the shutter driving ring 55 is rotated by the rod-shaped key member 52 so that the shutter mechanism part 65 is operated (i.e. actuated).

Figure 12:
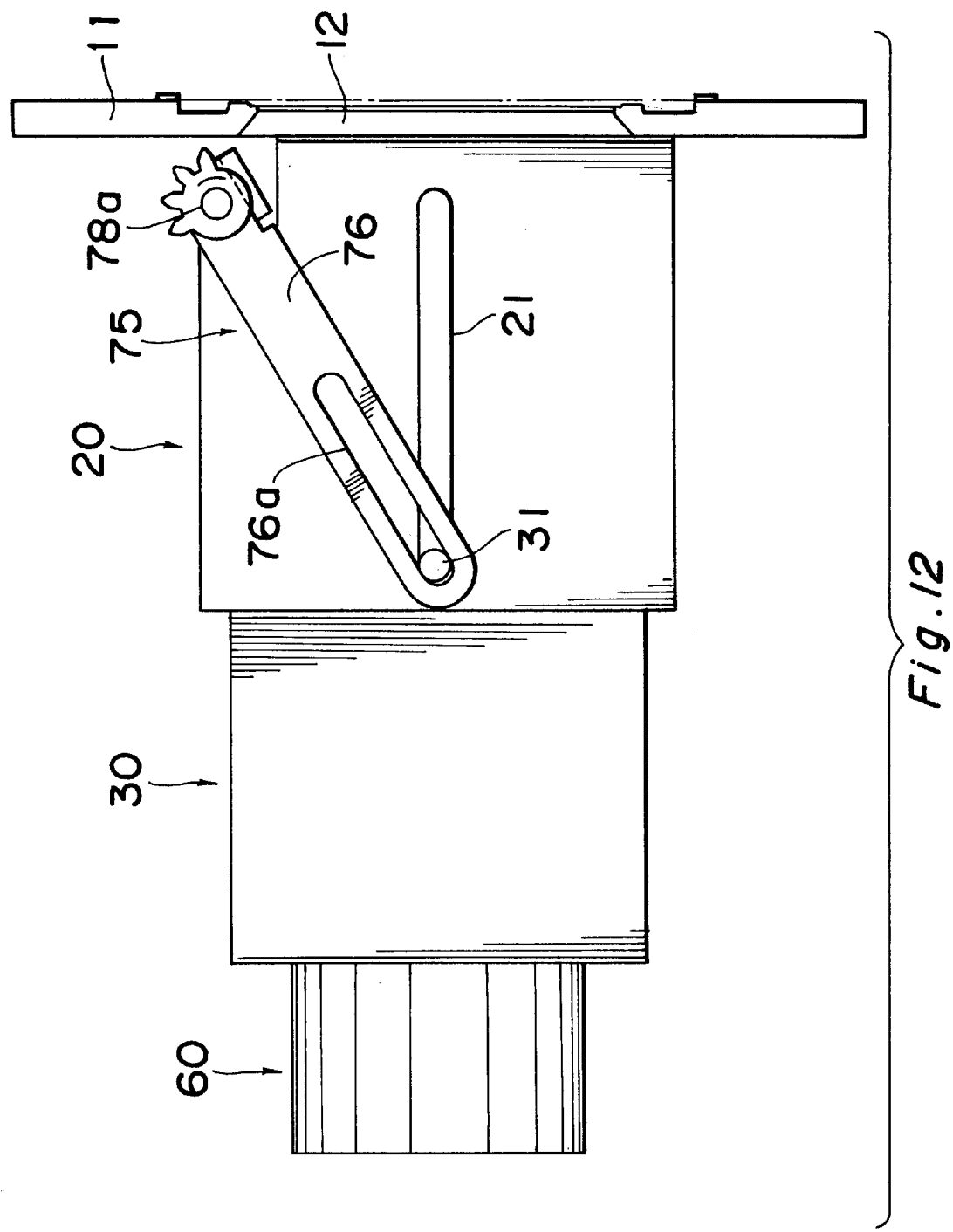
FIG. 12 is a side view of the zoom lens barrel of the camera, in which the zoom lens barrel is in the projecting state.

As described above, the support arm 75 rotates in linkage with the first movable lens barrel 30 sliding within the stationary lens barrel 20. FIG. 12 shows a telephoto state (or telephoto position) in which the zoom lens barrel has expanded to the full length (i.e. to the maximum length). In the preferred embodiment, a mechanical part on the side of the camera body is driven by making use of rotation of the support arm 75, which will be explained below.

Namely, as shown in FIG. 12, one of the pair of arm portions 76, 77 has a gear portion 78a at a location which corresponds to one of a pair of ends of the stay 78. The gear portion 78a is integrally formed on the arm portion 76 (this gear portion 78a is omitted in FIG. 1). The gear portion 78a is engaged with a final gear of a gear train in the mechanical part provided on the side of the camera body, so that the mechanical part can be driven, or actuated, in linkage with the back and forth movement of the first movable lens barrel 30 relative to the stationary lens barrel 20.

The mechanical part provided on the side of the camera body can be a lens barrier opening/closing drive mechanism, a flash gun opening/closing drive mechanism in the camera equipped with a retractable type of flash gun, or the like.

As another example, the mechanical part provided on the side of the camera body can be a drive mechanism for changing a distance between a light-emitting tube and a reflection hood in the camera in which an illumination angle of flash gun is changed in response to an zooming operation.

As still another example, the mechanical part provided on the side of the camera body can be a zooming mechanism in a viewfinder optical system in a lens shutter camera.

As another means for transfer of the driving force to the mechanical part on the side of the camera body, it is possible to provide a cam surface on the stay 78 of the support arm 75, and to provide a cam follower, engaging the cam surface, on a drive pin, for example, which drives the mechanical part on the side of the camera body.

Alternatively, the driving force can be gained directly from the linear movement of the first movable lens barrel 30 relative to the stationary lens barrel 20. More specifically, for example, there can be provided an operation pin member for driving the mechanical part on the side of the camera body, and the posture holding pin 31 projecting from the side of the first movable lens barrel 30 can drive the operation pin member.

In the preferred embodiment which is illustrated in the accompanying drawings, the drive motor 80 for driving the drive lens barrel 40, and the shutter drive motor 66, as electric components, arranged in the space 39, are shown, for example in FIG. 9. However, components which are provided in the space 39 are not limited to those elements like the drive motor 80 and the shutter drive motor 66 in the embodiment.

Figure 13:
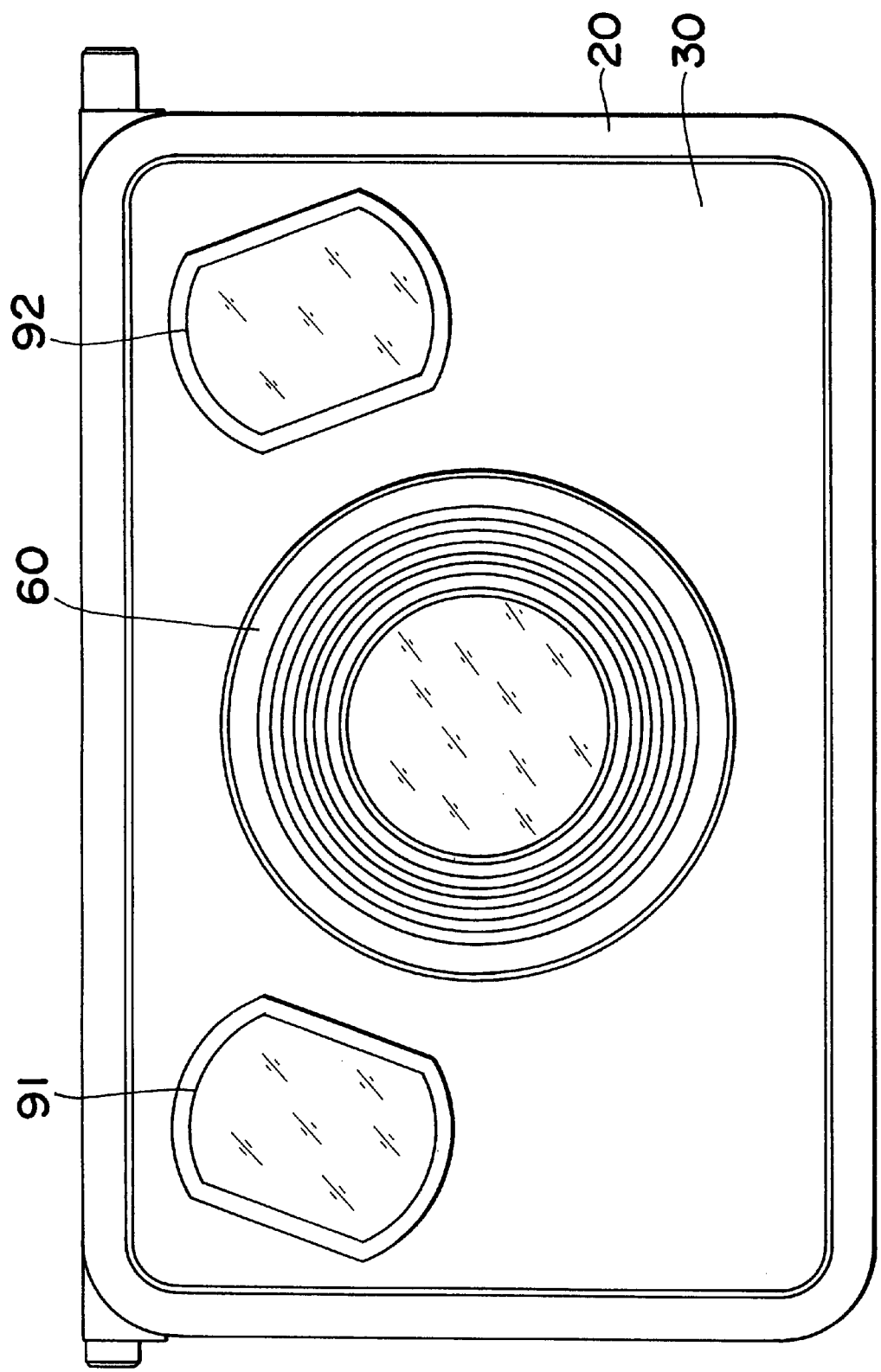
FIG. 13 is a view showing an appearance of a first modification in which an active AF unit having a light emitting part and a light receiving part is mounted in a space forming between a movable lens barrel and a drive lens barrel.

FIG. 13 is an appearance view showing a first modification in which an active AF unit having a light emitting part and a light receiving part is arranged in the space 39. The figure shows only a forefront part of a zoom lens barrel of the first modification, in which a light emitting window 91 as the light emitting part, and a light receiving window 92 as the light receiving part are shown. In this arrangement, the drive motor for driving the movable lens barrel and the shutter drive motor, are positioned below the AF unit inside the zoom lens barrel. By the way, it is to be noted that the posture holding pin 31 and the contact portion 34 provided on the first movable lens barrel are omitted in FIG. 13.

Figure 14:
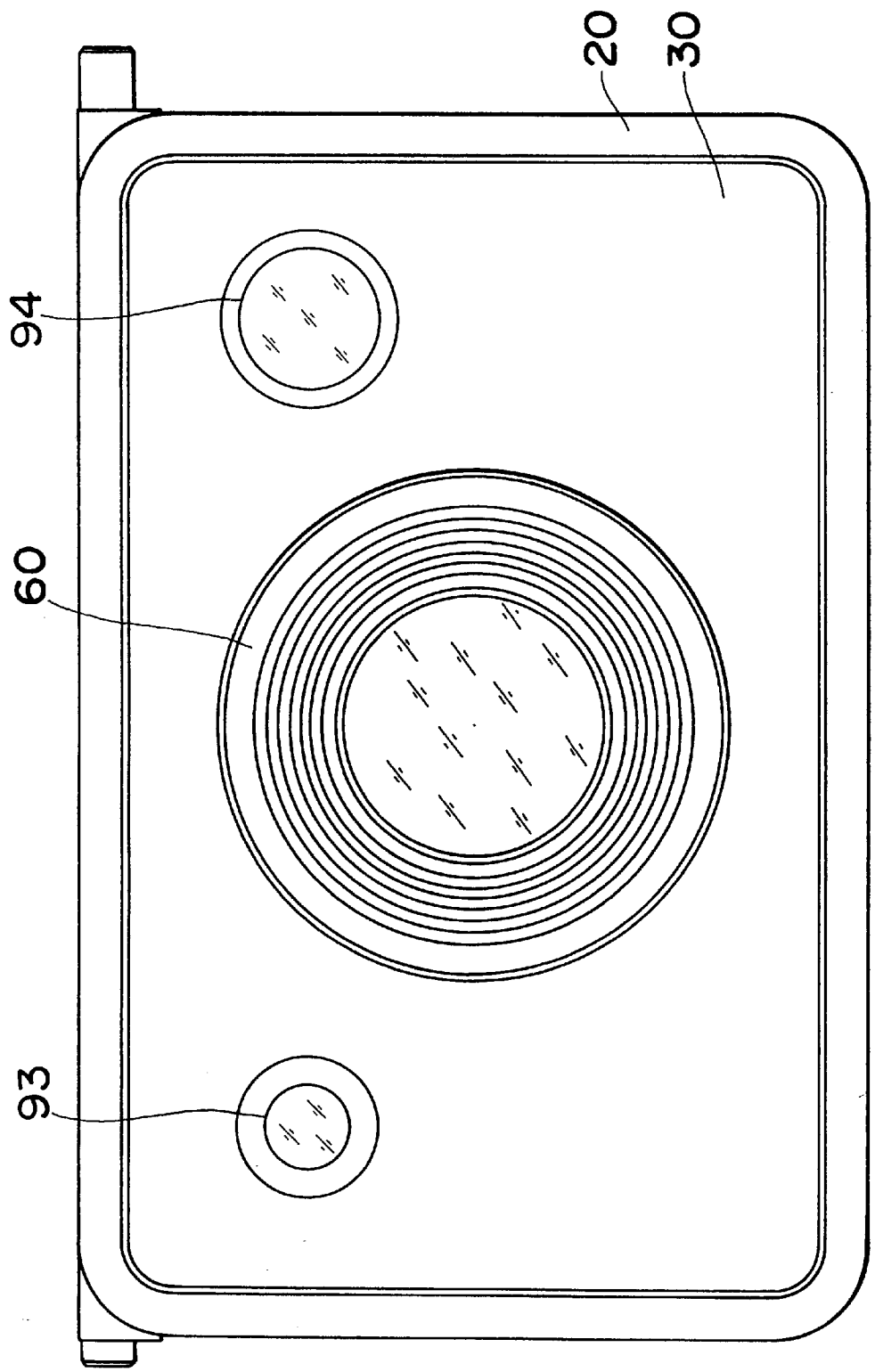
FIG. 14 is a view showing an appearance of a second modification in which an AE unit and a self-timer LED are arranged in a space forming between a movable lens barrel and a drive lens barrel.

On the other hand, FIG. 14 is an appearance view showing a second modification in which an AE unit and a self-timer LED are provided in the space 39. In the figure, an LED light emitting part 93 and an AE light receiving part 94 appear on a front surface of the first movable lens barrel 30. In this modification, the drive motor for driving the movable lens barrel and the shutter drive motor, are mounted at a lower position within the zoom lens barrel, too. In FIG. 14, it is to be noted that the posture holding pin 31 and the contact portion 34 formed on the first movable lens barrel are omitted, too.

Other than the aforementioned embodiment and modifications explained with reference to the accompanying drawings, it is also possible that, for example, there are/is provided a passive AF unit formed integrally and compactly, and/or a viewfinder window (i.e. finder, or finder window) mounted on the front face of the movable barrel 30, and that the aforementioned space is utilized as a viewfinder optical path. Of course, the camera component provided in the space is not limited to the component explained above.

The aforementioned description has been made upon the zoom lens barrel of one type of camera in which both the zooming operation and the focusing operation are performed by the same mechanism. However, it is needless to say that the present invention is not limited to the zoom lens barrel provided in such a type of camera.

Although the present invention has been fully described in connection with the preferred embodiment and its modifications with reference to the accompanying drawings, it is to be noted that still other various changes and modifications are also apparent to those skilled in the art. Such changes and modifications are to be understood as included within the scope of the present invention as defined by the appended claims unless they depart therefrom.

What is claimed is:

1. A zoom lens barrel, comprising:
    a stationary lens barrel which is hollow and rectangular in cross section perpendicular to an optical axis;
    a first movable lens barrel which is hollow and rectangular in cross section perpendicular to the optical axis, and which slidably moves inside the stationary lens barrel in a direction of the optical axis; and
    a second movable lens barrel which is hollow and circular in cross section perpendicular to the optical axis, and which slidably moves inside the first movable lens barrel during a zooming operation,
    wherein the zoom lens barrel can take a projecting state and a retracting state, and
    wherein at least one electric component is positioned inside the first movable lens barrel, and wherein the at least one electric component is positioned in a space outside the second movable lens barrel when the zoom lens barrel is in the retracting state.

2. The zoom lens barrel as claimed in claim 1, whererin the at least one electric component is at least one of a drive motor for driving the first movable lens barrel, a drive motor for driving a shutter, an AF unit, an AE unit, and an LED for a self-timer.

3. The zoom lens barrel as claimed in claim 1, wherein the at least one electric component is supported by the first movable lens barrel.

4. The zoom lens barrel as claimed in claim 1, wherein the at least one electric component moves together with the first movable lens barrel relative to the stationary lens barrel.

5. The zoom lens barrel as claimed in claim 1, wherein there is further provided a third movable lens barrel which is hollow and circular in cross section being perpendicular to the optical axis, and which slidably moves inside the second movable lens barrel.

6. A zoom lens barrel, comprising:
    a stationary lens barrel which is hollow and rectangular in cross section perpendicular to an optical axis;
    a first movable lens barrel which is hollow and rectangular in cross section perpendicular to the optical axis;
    a drive lens barrel which is hollow and circular in cross section perpendicular to the optical axis, and which is held inside the first movable lens barrel, in which the drive lens barrel is rotatable relative to the first movable lens barrel, and in which the drive lens barrel is unmovable relative to the first movable lens barrel in the direction of the optical axis; and
    at least one lens group which is held inside the drive lens barrel, in which the at least one lens group is movable relative to the drive lens barrel in the direction of the optical axis,
    wherein at least one electric component is accommodated in a space between the first movable lens barrel and the drive lens barrel.

7. The zoom lens barrel as claimed in claim 6, wherein the first movable lens barrel has a plurality of linear guide members which are fixed to an inside of a body of the first movable lens barrel, in which each of the plurality of linear guide members extends in the direction of the optical axis, in which the plurality of linear guide members are included in a peripheral surface of an imaginary cylinder, and in which the drive lens barrel rotatably engages an outside of the plurality of linear guide members,
    wherein the stationary lens barrel comprises a first helicoid part which is formed partially on an inner surface of the stationary lens barrel, in which the drive lens barrel comprises a second helicoid part which is formed at least partially on an outer surface of the drive lens barrel and which engages the first helicoid part of the stationary lens barrel, and in which the drive lens barrel comprises a drive gear part which is formed at least partially on the outer surface of the drive lens barrel,
    wherein there is further provided at least one lens frame for supporting the at least one lens group, in which the drive lens barrel comprises one, of a cam groove and a first helicoid, which is formed on an inner surface of the drive lens barrel, in which the lens frame comprises one of a pin that engages the cam groove and a second helicoid that engages the first helicoid, and in which the lens frame further comprises an engagement part which engages the linear guide member, and
    wherein when the drive gear part of the drive lens barrel is driven by a driving force exerted from a driving motor so as to rotate the drive lens barrel relative to the first movable lens barrel, the first movable lens barrel being slidably movable relative to the stationary lens barrel in the direction of the optical axis due to an engagement between the first helicoid part of the stationary lens barrel and the second helicoid part of the drive lens barrel, while the at least one lens group moves relative to the drive lens barrel along the linear guide member in the direction of the optical axis.

8. The zoom lens barrel as claimed in claim 7, wherein the at least one electric component is at least one of a drive motor for driving the drive lens barrel, a drive motor for driving a shutter, an AF unit, an AE unit, and an LED for a self-timer.

9. The zoom lens barrel as claimed in claim 6, wherein the at least one electric component is at least one of a drive motor for driving the drive lens barrel, a drive motor for driving a shutter, an AF unit, an AE unit, and an LED for a self-timer.

10. The zoom lens barrel as claimed in claim 6, wherein the at least one electric component is supported by the first movable lens barrel, in which the at least one electric component moves together with the first movable lens barrel relative to the stationary lens barrel, and
    wherein there is further provided a second movable lens barrel which is hollow and circular in cross section being perpendicular to the optical axis, and which slidably moves inside the drive lens barrel.

11. A photographing apparatus, comprising:

a stationary lens barrel which is hollow and rectangular in cross section perpendicular to an optical axis;

a first movable lens barrel which is hollow and rectangular in cross section perpendicular to the optical axis, and which slidably moves inside the stationary lens barrel in a direction of the optical axis; and a second movable lens barrel which is hollow and circular in cross section perpendicular to the optical axis, and which slidably moves inside the first movable lens barrel during a zooming operation, wherein the zoom lens barrel can take a projecting state and a retracting state, and wherein at least one electric component is positioned inside the first movable lens barrel, and wherein the at least one electric component is positioned in a space outside the second movable lens barrel when the zoom lens barrel is in the retracting state.

12. A photographing apparatus, comprising:

a stationary lens barrel which is hollow and rectangular in cross section perpendicular to an optical axis;

a first movable lens barrel which is hollow and rectangular in cross section perpendicular to the optical axis, and which slidably moves inside the stationary lens barrel in a direction of the optical axis;

a drive lens barrel which is hollow and circular in cross section perpendicular to the optical axis, and which is held inside the first movable lens barrel, in which the drive lens barrel is rotatable relative to the first movable lens barrel, and in which the drive lens barrel is unmovable relative to the first movable lens barrel in the direction of the optical axis; and at least one lens group which is held inside the drive lens barrel, in which the at least one lens group is movable relative to the drive lens barrel in the direction of the optical axis, wherein at least one electric component is accommodated in a space between the first movable lens barrel and the drive lens barrel.

* * * * *